(12) United States Patent
Takano et al.

(10) Patent No.: US 9,596,467 B2
(45) Date of Patent: Mar. 14, 2017

(54) MOTION ESTIMATION DEVICE FOR PREDICTING A VECTOR BY REFERRING TO MOTION VECTORS OF ADJACENT BLOCKS, MOTION ESTIMATION METHOD AND STORAGE MEDIUM OF MOTION ESTIMATION PROGRAM

(75) Inventors: Fumiyo Takano, Tokyo (JP); Tatsuji Moriyoshi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 857 days.

(21) Appl. No.: 13/995,572

(22) PCT Filed: Dec. 16, 2011

(86) PCT No.: PCT/JP2011/079970
§ 371 (c)(1),
(2), (4) Date: Jun. 19, 2013

(87) PCT Pub. No.: WO2012/086829
PCT Pub. Date: Jun. 28, 2012

(65) Prior Publication Data
US 2013/0272421 A1    Oct. 17, 2013

(30) Foreign Application Priority Data
Dec. 21, 2010    (JP) .................................. 2010-284613

(51) Int. Cl.
H04N 7/12         (2006.01)
H04N 19/51       (2014.01)
(Continued)

(52) U.S. Cl.
CPC ....... *H04N 19/00703* (2013.01); *H04N 19/43* (2014.11); *H04N 19/436* (2014.11); *H04N 19/52* (2014.11); *H04N 19/61* (2014.11)

(58) Field of Classification Search
CPC ............. H04N 19/00703; H04N 19/43; H04N 19/436; H04N 19/52; H04N 19/06
(Continued)

(56) References Cited

U.S. PATENT DOCUMENTS 6,590,937 B1 *   7/2003  Ogura .................... G06T 7/202
                                                            375/240.16
7,643,559 B2 *   1/2010  Kato .................... H04N 19/176
                                                            375/240.23
(Continued)

FOREIGN PATENT DOCUMENTS

EP    1 746 842 A1 *  1/2005
EP    1746842 A1      1/2007
(Continued)

OTHER PUBLICATIONS

ITU-T Recommendation H.264 "Advanced video coding for generic audiovisual services", May 2003, whole documents.
(Continued)

*Primary Examiner* — Jessica M Prince

(57) ABSTRACT

When searching the motion in a video image, According to the present invention, it is possible to calculate a large number of motion vectors in parallel and to improve motion vector accuracy. A motion estimation device is a motion estimation device for predicting a vector by referring to the motion vector of adjacent blocks is provided with a plurality of motion estimating units which process adjacent blocks in parallel. Each motion estimating unit is provided with a pseudo predicted motion vector calculating unit for calculating a pseudo predicted motion vector by using the motion vector of a group of processed blocks, and a motion vector searching unit for searching the motion vector of a block to be processed by using the calculated pseudo predicted motion vector.

3 Claims, 28 Drawing Sheets

(51) Int. Cl.
  *H04N 19/61* (2014.01)
  *H04N 19/43* (2014.01)
  *H04N 19/436* (2014.01)
  *H04N 19/52* (2014.01)

(58) Field of Classification Search
  USPC .................................................... 375/240.16
  See application file for complete search history.

(56) References Cited

U.S. PATENT DOCUMENTS

| | | | | |
|---|---|---|---|---|
| 7,734,151 B2* | 6/2010 | Park | ............... | H04N 19/105 375/240.13 |
| 8,218,642 B2* | 7/2012 | Gao | ............... | H04N 19/176 375/240.16 |
| 8,576,911 B2* | 11/2013 | Choi | ............... | H04N 5/145 348/699 |

FOREIGN PATENT DOCUMENTS

| | | |
|---|---|---|
| JP | 2005-244503 A | 9/2005 |
| JP | 2006-345157 A | 12/2006 |
| JP | 2008-154085 A | 7/2008 |
| JP | 2009-55254 A | 3/2009 |

OTHER PUBLICATIONS

K. P. Lim et al., "Text Description of Joint Model Reference Encoding Methods and Decoding Concealment Methods", Joint Video Team (JVT) of ISO/IEC MPEG and ITU-T VCE, Busan, Korea, Apr. 2005.

Sullivan, G.J. et al., "Rate-distortion optimization for video compression", Signal Processing Magazine, IEEE, vol. 15, No. 6, pp. 74-90, Nov. 1998, pp. 75-90.

Nagai-Man Cheung et al.,"Video Coding on Multicore Graphics Processors", Signal Processing Magazine, IEEE, vol. 27, No. 2, pp. 79-89, Mar. 2010.

Wei-Nien Chen et al., "H.264/AVC Motion Estimation Implementation on Compute Unified Device Archtecturer (CUDA)", Multimedia and Expo, 2008 IEEE International Conference on, pp. 697-700, Jun. 23, 2008-Apr. 26, 2008.

International Search Report for PCT Application No. PCT/JP2011/079970 mailed on Apr. 3, 2012.

Extended European Search Report for EP Application No. EP11851988.3 mailed on May 28, 2015.

Bart Pieters; Charles F. Hollemeersch; Peter Lambert; Rik Van De Walle: "Motion Estimation for H.264/AVC on Multiple GPUsUsing NVIDIA CUDA", SPIE Proceedings, Applications of Digital Image Processing, vol. 7443, Sep. 2, 2009 (Sep. 2, 2009).

Chen M C et al: "A High Accuracy Predictive Logarithmic Motion Estimation Algorithm for Video Coding", 1995 IEEE International Symposium on Circuits and Systems (ISCAS). Seattle, Apr. 30-May 3, 1995; [International Symposium on Circuits and Systems (ISCAS)], New York. IEEE, US, vol. 1, Apr. 30, 1995 (Apr. 30, 1995), pp. 617-620.

Lei-Chun Chou et al: "Fast Predictive Search Algorithm for Video Motion Estimation", 14th International Conference on Image Analysis and Processing, 2007. ICIAP 2007, Sep. 10-13, 2007—Modena, Italy, IEEE. Piscataway, NJ, USA, Sep. 1, 2007 (Sep. 1, 2007), pp. 399-406.

* cited by examiner

Fig.3
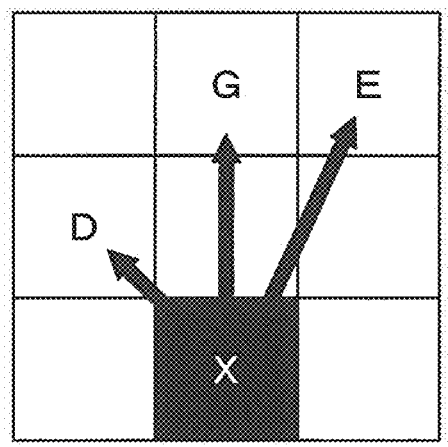
Fig.4
Fig.5
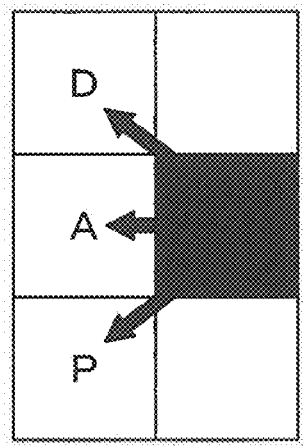

Fig.6
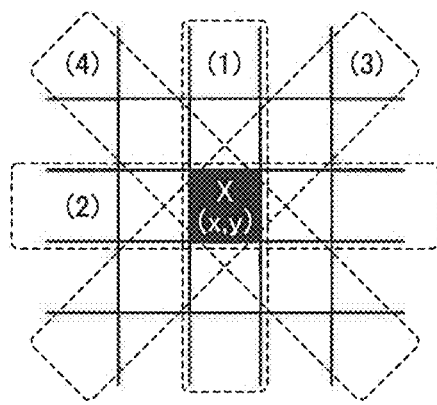
Fig.7
Fig.8
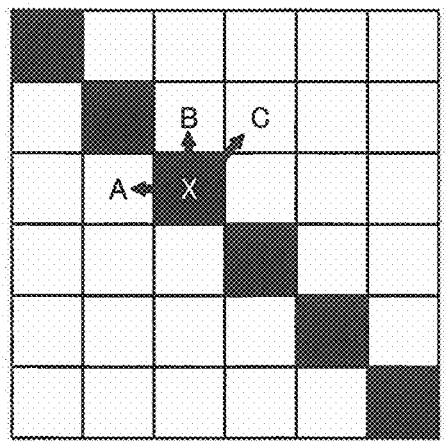

Fig.9
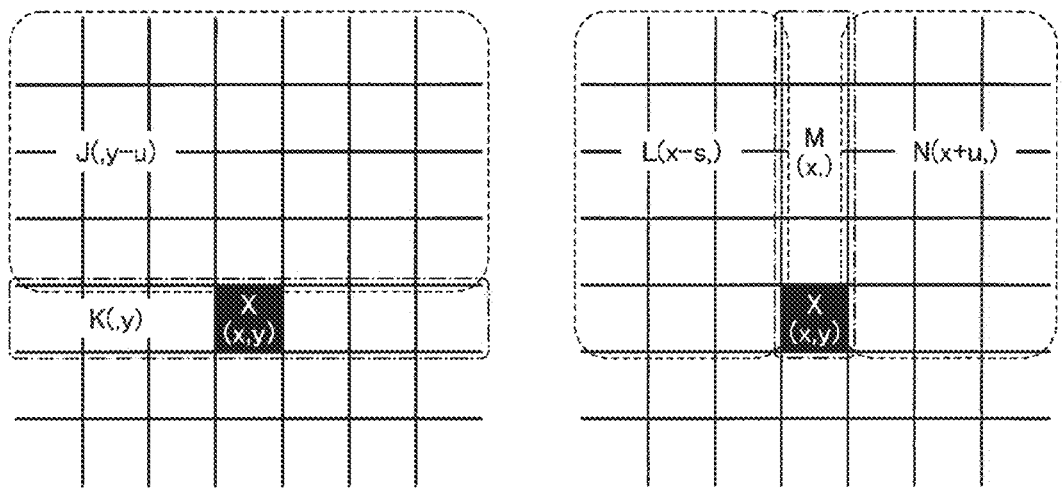
Fig.10
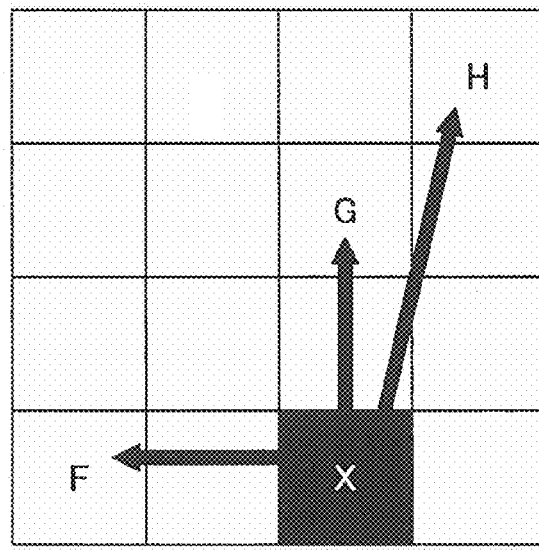
Fig.11

| 1  | 2  | 3  | 4  | 5  | 6  |
|----|----|----|----|----|----|
| 3  | 4  | 5  | 6  | 7  | 8  |
| 5  | 6  | 7  | 8  | 9  | 10 |
| 7  | 8  | 9  | 10 | 11 | 12 |
| 9  | 10 | 11 | 12 | 13 | 14 |
| 11 | 12 | 13 | 14 | 15 | 16 |

MOTION ESTIMATION DEVICE FOR PREDICTING A VECTOR BY REFERRING TO MOTION VECTORS OF ADJACENT BLOCKS, MOTION ESTIMATION METHOD AND STORAGE MEDIUM OF MOTION ESTIMATION PROGRAM

This application is a National Stage Entry of PCT/JP2011/079970 filed Dec. 16, 2011, which claims priority from Japanese Patent Application 2010-284613 filed Dec. 21, 2010, the contents of all of which are incorporated herein by reference, in their entirety.

TECHNICAL FIELD

The present invention relates to a motion estimation device, a motion estimation method, a motion estimation program and a video image encoding device.

BACKGROUND ART

In recent years, an image size expansion request of a video image is rising year by year, and in connection with that, a coding technology has progressed so that compression efficiency may also improve like MPEG-2, MPEG-4, and H.264/MPEG-4AVC (hereinafter, H.264). Incidentally in the above, MPEG is an abbreviation for Moving Picture Experts Group. AVC is an abbreviation for Advanced Video Coding. These coding methods have achieved high encoding efficiency by compressing information using inter-frame motion compensation. For example, the contents of the process based on the standard of H.264 are disclosed in non-patent document 1. And the details of a video image encoding device based on the standard of H.264 are disclosed in non-patent document 2.

Here, the motion compensation is a technology which compresses video image information by the following method. First, an estimated image which performed motion compensation to an image of a reference frame is generated using motion information between a coding object frame and the reference frame. And only a difference between the coding object frame and the estimated image, and motion information called a motion vector are coded.

For example, the process of the video image coding in H.264 including motion compensation is performed by a 16×16 pixel macro block unit. A process which calculates motion information is called motion estimation, and it searches a block with high similarity to the coding object block from the reference frame for every block of 16×16 pixels or 8×8 pixels in a macro block. The motion vector represents the difference of the positions between the block with the highest similarity in the reference frame and the coding object block.

And adjacent motion vectors have high correlation with each other. Accordingly, the code amount of the motion vector can also be reduced by calculating a predicted motion vector from the motion vector of the adjacent block which is already processed, and coding only a difference between the predicted motion vector and the motion vector. A rate-distortion optimization method for searching a motion vector with good coding efficiency is disclosed in non-patent document 3.

FIG. 30 is a block diagram showing a configuration of a video image encoding device 5000 described in non-patent document 1. FIG. 31 is a flow chart showing operation of the video image encoding device 5000.

First, a motion estimating unit 50110 of the video image encoding device 5000 calculates a predicted motion vector PMV of a coding object block from a motion vector of adjacent blocks (Step S102). And motion vector search which optimized the rate distortion using PMV is performed (Step S103). A motion compensation unit 5020 generates an estimated image using the motion vector.

Because the recent years' coding method such as H.264 has much computational complexity, improvement in the speed is attained by parallel processing in many cases. There is parallelization of a block unit as one of parallelization methods of motion estimation processing. Motion estimation is mostly independent for every block, and easy to parallelize. However, because a calculation of a predicted motion vector uses a processing result of the adjacent blocks, restrictions occur in processing order.

As shown in non-patent document 2, a median of a motion vector in blocks A, B and C is employed as a predicted motion vector of a block X shown in FIG. 32 by motion estimation in H.264. the sum of the code amount of the difference of a predicted motion vector and each candidate vector (vector cost), and the evaluation value of degree of similarity, such as a difference absolute value sum of the image block which performed motion compensation by each candidate vector, and a coding object block, is defined as a cost in motion vector search. And in the motion vector search, a vector by which the cost becomes smallest is searched. Because only the difference of a predicted motion vector and a motion vector, and the difference of an estimated image and an original image are coded at the time of coding, encoding efficiency improves by vector prediction.

As mentioned above, when using the predicted motion vector, in order to obtain accurate vector cost at the time of motion estimation, if the process in blocks A, B and C is not completed, and the motion vector is not determined, the motion estimation of the coding object block X cannot be started. It is disclosed in non-patent document 4 an example for performing parallel processing so that this restriction may be satisfied.

FIG. 34 is a block diagram showing a configuration of a parallel motion estimation device 700 described in non-patent document 4.

A motion vector which a motion vector searching unit 112 determined is stored in a motion vector buffer 120, and a predicted motion vector calculation unit 711 calculates a predicted motion vector using a motion vector of other blocks stored in the motion vector buffer 120. FIG. 33 shows the parallel processing order in the parallel motion estimation device 700 described in non-patent document 4. In FIG. 33, a block to which the identical number is given is the block which can be processed in parallel.

On the other hand, an example of a parallel motion estimation device which does not perform a vector prediction is disclosed in non-patent document 5. FIG. 35 is a block diagram showing a configuration of a parallel motion estimation device 500 described in non-patent document 5. This parallel motion estimation device 500 differs from the parallel motion estimation device 700 shown in FIG. 34 in a point that a motion estimating unit 510 is not provided with the predicted motion vector calculation units 711. When motion vector search is performed without performing a vector prediction like non-patent document 5, there is not a dependence relationship between the blocks, and all blocks can be processed in parallel.

It is disclosed in patent document 1 a parallel video image encoding device for processing by using the processing result of the neighboring blocks when the processing result of blocks A, B and C of FIG. 32 is not determined. FIG. 36 is a block diagram showing a configuration of a parallel motion estimation device 600 described in patent document 1. The parallel motion estimation device 600 has a motion estimating unit 610.

The motion estimating unit 610 includes a predicted motion vector calculation unit 61, a motion vector searching unit 62, a pseudo predicted motion vector calculating unit 63, a direct mode and skip mode cost calculation unit 64 and a mode judgment unit 65.

When a motion vector in blocks A, B and C used for calculating a predicted motion vector is not determined, operation of the motion estimating unit 610 is as follows. First, a pseudo predicted motion vector is calculated using the neighborhood block. Next, the cost of the direct mode or skip mode is calculated using this calculated pseudo predicted motion vector. The motion vector searching unit 62 searches a motion vector without using a predicted motion vector.

The mode judgment unit 65 compares the cost in each mode, and outputs the result of the judgment. Each processing in the motion estimating unit 610 operates in parallel by pipelining. FIG. 37 is a flow chart illustrating operation of this parallel motion estimation device 600. The motion vector searching unit 62 searches a motion vector without using a predicted motion vector (Step S301). The pseudo predicted motion vector calculating unit 63 calculates a pseudo predicted motion vector PMVx from the neighboring blocks in a specified block (Step S302). The direct mode and skip mode cost calculation unit 64 evaluates the cost of the direct mode and the skip mode using the pseudo predicted motion vector PMVx (Step S303). The mode judgment unit 65 waits that a motion vector of the specified blocks A, B and C is determined (Step S304) and calculates a predicted motion vector PMV from the motion vector of the specified block (Step S305). When PMVx and PMV are not equal, the result calculated in Step S303 is discarded (Step S308). When PMVx and PMV are equal, a mode is determined (Step S309) using the result calculated in Step S303 (Step S307).

The video image coding of H.264 is premised on sequential processing as described in non-patent document 1, and a macro block is processed by the raster scan order from the upper left. Therefore, there are a lot of parts to be processed using information on the macro block of the upper or the left which is already processed in the sequential processing. The motion estimating unit achieves the high coding efficiency by using information on the macro blocks of the left, the upper and the upper right, and also by using the macro blocks of the left and the upper in the intra predicting unit and the deblocking filter, as described in non-patent document 2.

In recent years, performance improvement of a GPU (Graphics Processing Unit) which is a 3D graphics processing processor as a parallel processing arithmetic unit is remarkable. The GPU is a many-core processor in which numerous cores from tens to hundreds cores are integrated, and in order to draw out the performance, sufficient parallelism for processing application is needed.

THE PRECEDING TECHNICAL LITERATURE

Patent Document

[Patent document 1] Japanese Patent Application Laid-Open No. 2005-244503

Non-Patent Document

[Non-patent document 1] ITU-T Recommendation H.264 "Advanced video coding for generic audiovisual services" May 2003.

[Non-patent document 2] K. P. Lim, G. Sullivan and T. Wiegand, "Text Description of Joint Model Reference Encoding Methods and Decoding Concealment Methods" and Joint Video Team (JVT) of ISO/IEC MPEG and ITU-T VCEG, Busan, Korea and April 2005

[Non-patent document 3] Sullivan, G. J.; Wiegand, T.; "Rate-distortion optimization for video compression" Signal Processing Magazine, IEEE, vol. 15, no. 6, pp. 74-90 and November 1998

[Non-patent document 4] Nagai-Man Cheung; Xiaopeng Fan; Au, O. C.; Man-Cheung Kung;, Signal Processing Magazine, IEEE, vol. 27, no. 2, pp. 79-89 and March 2010

[Non-patent document 5] Wei-Nien Chenl and Hsueh-Ming Hangl, "H.264/AVC Motion Estimation Implementation on Compute Unified Device Archtecturer (CUDA)", Multimedia and Expo, 2008 IEEE International Conference on, pp. 697-700 and Jun. 23, 2008-Apr. 26, 2008

SUMMARY OF INVENTION

Technical Problem

In the background arts mentioned above, there is a problem that there are few numbers of blocks that can be processed in parallel, or a precision of the motion vector search result is bad.

In the method described in non-patent document 4, there are few numbers of blocks that can be processed in parallel. When there are few numbers of blocks that can be processed in parallel and when processing in parallel using a many-core processor having many processors such as GPUs in particular, a parallelization efficiency is low and enough processing speed cannot be obtained.

Because the number of blocks that can be processed in parallel with a method described in patent document 1 is also small and a motion vector is not searched by using a predicted motion vector, the precision of vector cost is low, and the precision of motion vector search result is bad. Although all blocks can be processed in parallel with a method described in non-patent document 5 and the number of blocks that can be processed in parallel is large, the precision of vector cost is low, and the precision of motion vector search result is bad because a predicted motion vector is not used.

Object of the Invention

An object of the present invention is to provide a motion estimation device, a motion estimation method, a motion estimation program and a video image encoding device which can process a large number of blocks in parallel and calculate a motion vector at a high accuracy.

Solution to Problem

A motion estimation device of the present invention is a motion estimation device for predicting a vector by referring to the motion vector of adjacent blocks which is provided with a plurality of motion estimating units which process adjacent blocks in parallel, and each motion estimating unit is provided with a pseudo predicted motion vector calculating unit for calculating a pseudo predicted motion vector by using the motion vector of a group of processed blocks, and a motion vector searching unit for searching the motion vector of a block to be processed by using the calculated pseudo predicted motion vector.

A motion estimation method of the present invention is a motion estimation method to predict a vector by referring to the motion vector of adjacent blocks, a plurality of motion estimating units process adjacent blocks in parallel, a pseudo predicted motion vector is calculated by using the motion vector of a group of processed blocks in each motion estimating unit, and the motion vector of a block to be processed is searched by using the calculated pseudo predicted motion vector.

A motion estimation program of the present invention makes a computer of a motion estimation device for predicting a vector prediction by referring to the motion vector of adjacent blocks execute a function that a plurality of motion estimating units process adjacent blocks in parallel, and a function that each motion estimating unit calculates a pseudo predicted motion vector by using the motion vector of a group of processed blocks, and searches the motion vector of a block to be processed by using the calculated pseudo predicted motion vector.

Advantageous Effects of Invention

According to the present invention, it is possible to calculate a large number of motion vectors in parallel and to improve motion vector accuracy.

BRIEF DESCRIPTION OF THE DRAWINGS

FIG. 3 is a first block position example that the parallel motion estimation device in the first exemplary embodiment utilizes for a vector prediction.

FIG. 4 is a first parallel processing order example of the parallel motion estimation device in the first exemplary embodiment.

FIG. 5 is a second block position example that the parallel motion estimation device in the first exemplary embodiment utilizes for a vector prediction.

FIG. 6 is a second parallel processing order example of the parallel motion estimation device in the first exemplary embodiment.

FIG. 7 is a reference drawing showing a block position which the parallel motion estimation device in the first exemplary embodiment can utilize for a vector prediction.

FIG. 8 is an example of a block position which the parallel motion estimation device in the first exemplary embodiment cannot utilize for a vector prediction.

FIG. 9 is an example of the range where a block position which a parallel motion estimation device in a second exemplary embodiment utilizes for a vector prediction exists.

FIG. 10 is a block position example which the parallel motion estimation device in the second exemplary embodiment utilizes for a vector prediction.

FIG. 11 is a parallel processing order example of the parallel motion estimation device in the second exemplary embodiment.

DESCRIPTION OF EXEMPLARY EMBODIMENT

Hereinafter, exemplary embodiments of the present invention will be described in detail with reference to drawings.

[First Exemplary Embodiment]

Figure 1:
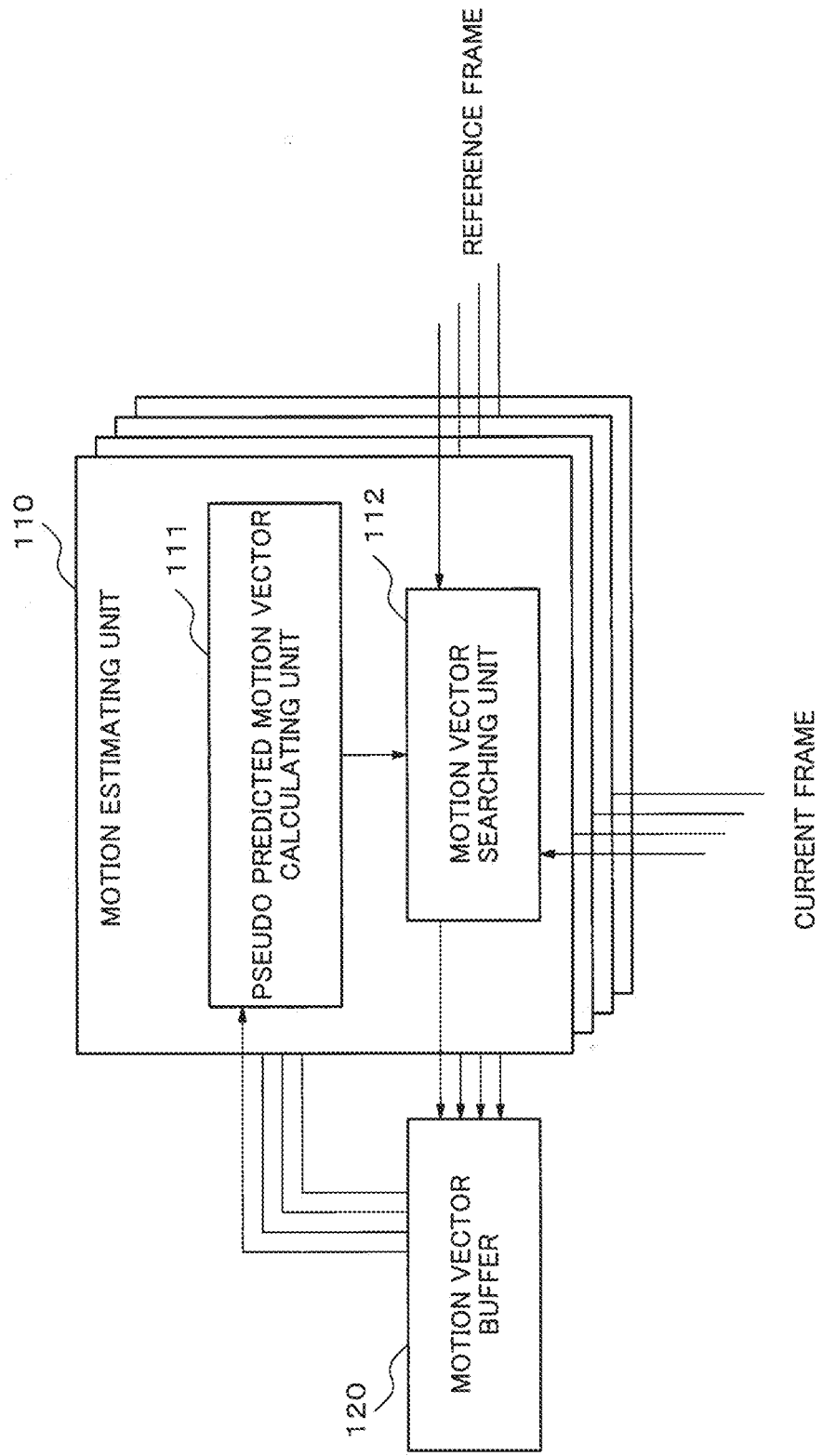
FIG. 1 is a block diagram showing an exemplary configuration of a parallel motion estimation device in the first exemplary embodiment of the present invention.

FIG. 1 is a block diagram showing an exemplary configuration of a parallel motion estimation device 100 in a first exemplary embodiment of the present invention. As shown in FIG. 1, in the parallel motion estimation device 100, a motion estimating unit 110 having a pseudo predicted motion vector calculating unit 111 and a motion vector searching unit 112 is constituted so that neighboring blocks may be processed in parallel.

Incidentally, although a case of 4 parallel processing is listed as an example in FIG. 4, this is just an example, and no more than 5 or less than 4 may be available as a parallel number. The function to calculate the cost of the direct mode or the skip mode like patent document 1 and to judge a mode may be added to the motion estimating unit 110.

The pseudo predicted motion vector calculating unit 111 acquires a motion vector of arbitrary blocks which have ended the processing from a motion vector buffer 120, calculates a pseudo predicted motion vector by a median of a vector, for example, and outputs the pseudo predicted motion vector. The motion vector searching unit 112 makes the pseudo predicted motion vector, the current frame and the reference frame an input, and outputs a motion vector with the best evaluation cost.

Here, a principle of a vector prediction (pseudo-vector prediction) in the first exemplary embodiment of the present invention will be described.

Figures 32, 33:
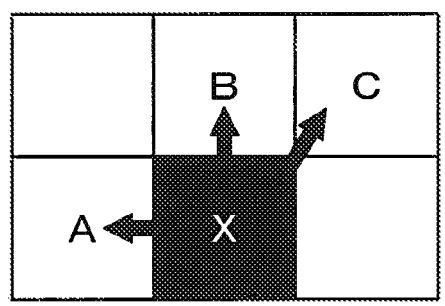
FIG. 32 is a block used for a vector prediction in a video image encoding device described in non-patent document 2.
FIG. 33 is a parallel processing order in a parallel motion estimation device shown in FIG. 34.

In the first exemplary embodiment, motion vector search is not performed by referring to an original predicted motion vector calculated from a motion vector of blocks A(x−1,y), B(x,y−1) and C (x+1,y−1) to a position (x,y) of a processing object block X shown in FIG. 32.

In the first exemplary embodiment, a pseudo predicted motion vector is calculated by referring a motion vector of a block set which may include the blocks any other than the blocks A, B and C. The above-mentioned pseudo predicted motion vector is calculated by a median of a motion vector, for example. Motion estimation processing between the neighbored blocks is performed in parallel by searching a motion vector in a processing object block using the calculated pseudo predicted motion vector. A block which is referred to in order to calculate the pseudo predicted motion vector uses a set of blocks to which the processing ended ahead.

FIG. 3 is a first block position example which the parallel motion estimation device in the first exemplary embodiment uses for a vector prediction. For example, referring to the blocks of D(x−1,y−1), G(x,y−2) and E(x+1,y−2) shown in FIG. 3 (that is, the block of X(x,y) is processed after ending the blocks D, G and E), the blocks which are laterally adjacent as shown in FIG. 4 can be processed in parallel.

FIG. 5 is a second block position example which the parallel motion estimation device in the first exemplary embodiment uses for a vector prediction. Referring to the blocks of D (x−1,y−1), A (x−1,y) and P (x−1,y+1) shown in FIG. 5 (that is, the block of X(x,y) is processed after ending the blocks D, A and P), and the blocks which are longitudinally adjacent as shown in FIG. 6 can be processed in parallel.

In order to process adjacent blocks in parallel, a block to be referred to must not exist in any one of longitudinal (1), lateral (2), right oblique (3), and left oblique (4) directions shown in FIG. 7. Blocks located in a direction which is not referred to are processed in parallel. For example, a case when the blocks of D (x−1,y−1), A (x−1,y) and P (x−1,y+1) shown in FIG. 5 are referred to is assumed. In the case, because the block A locates in the lateral (2), the block P in the right oblique (3) and the block D in the left oblique (4), only the block in the longitudinal (1) direction can be processed in parallel. Referring to a block D (x−1,y−1), G (x,y−2) and E (x+1,y−2) shown in FIG. 3, because the block G locates in the longitudinal (1), and the block D in the left oblique (4), a block in the lateral or the right oblique direction can be processed in parallel. And the processing proceeds to the longitudinal direction with regard to the blocks processed in parallel such that the processing proceeds to the lateral (2) direction when the blocks adjacent to the longitudinal (1) are processed in parallel, and the processing proceeds to the left oblique (4) direction when the blocks adjacent to the right oblique (3) are processed. Therefore, only one of processes of the upper side or the lower side of a processing object block is ended when the blocks adjacent to the lateral direction are processed in parallel, and only one of processes of the right side or the left side thereof is ended when the blocks adjacent to the longitudinal direction are processed in parallel, respectively.

Either the processes of the left side, the upper side, or the upper left side, or the processes of the right side, the lower side, or the lower left side of the processing object block is ended when they are the blocks adjacent to the right oblique direction.

Either the processes of the left side, the lower side, or the lower left side, or the processes of the right side, the upper side, or the upper right side of the processing object block is ended when they are the blocks adjacent to the left oblique direction.

When the process is performed in order as shown in FIG. 4, the process of a block below the processing object is not started. Because the process of the processing object block cannot be performed if the process of the reference block is not ended, and the process of any blocks referred to will not be ended ahead when the blocks referred to exist in both sides of the upper and the lower, or the right and the left, and the process of the object block cannot be performed. For example, when the blocks to be processed in parallel are adjacent to the longitudinal (1) direction, and the blocks referred to exist in the right side and the left side, the process thereof cannot be performed. When the blocks to be processed in parallel are adjacent to the left oblique (4) direction, and the blocks referred to exist in both the upper right side and the lower left side, the process thereof cannot be performed.

From the above, a set of the blocks used for calculating a predicted motion vector in this exemplary embodiment do not include simultaneously all of blocks A (x−1,y), B (x,y−1) and C (x+1,y−1) referred to in order to calculate an original predicted motion vector. The block A is adjacent to the processing object block X in the lateral (2). The block B is adjacent to the processing object block X in the longitudinal (1). The block C is adjacent to the processing object block X in the right oblique (3). Therefore, only adjacent blocks in the left oblique (4) direction can be processed in parallel. However, because the block A locates in the left of the block X and the block C locates in the upper right of the block X as shown in FIG. 8, the process for either the block A or the block C does not end in advance and cannot be referred to. Therefore, when referring to all blocks A, B and C in the processing of all blocks, adjacent blocks cannot be processed in parallel. When a part of blocks A, B and C is included in a reference block set like a third exemplary embodiment mentioned later, or when all of A, B and C are included in a reference block set in a part of blocks like a fourth exemplary embodiment mentioned later, it is possible to process adjacent blocks in parallel.

Figure 2:
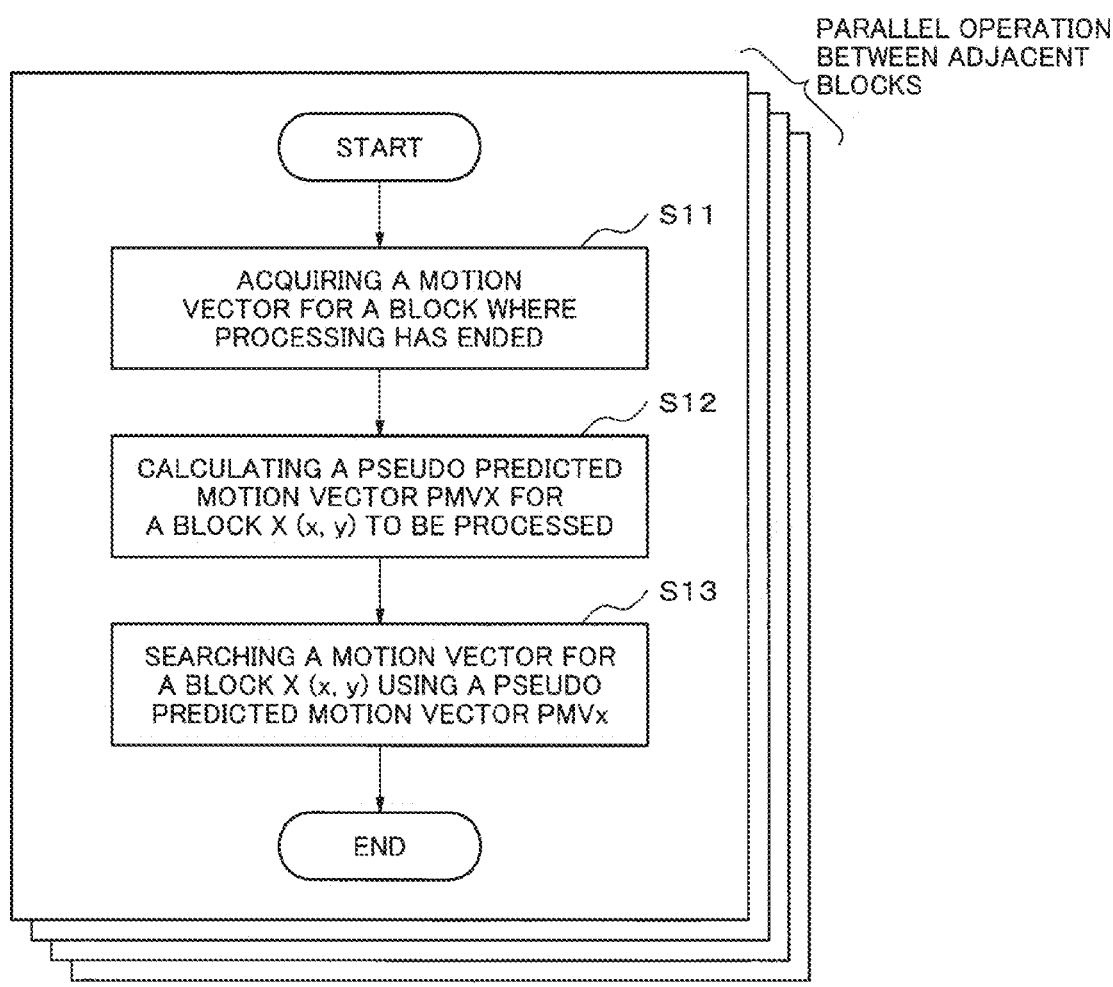
FIG. 2 is a flow chart showing an example of operation of the parallel motion estimation device in the first exemplary embodiment.

FIG. 2 is a flow chart showing an example of operation of the parallel motion estimation device 100 in the first exemplary embodiment. The pseudo predicted motion vector calculating unit 111 acquires a motion vector of processed blocks, for example blocks D, G and E in FIG. 3, from the motion vector buffer 120 (Step S11). The pseudo predicted motion vector calculating unit 111 calculates a pseudo predicted motion vector PMVx using the acquired motion vector, for example from a median of a vector (Step S12). The motion vector searching unit 112 searches a motion vector using the pseudo predicted motion vector PMVx (Step S13). In the motion estimating unit 110, Steps S11, S12 and S13 are processed in parallel for the adjacent blocks.

Next, the effect by the difference between this exemplary embodiment and the background art will be described.

Figure 34:
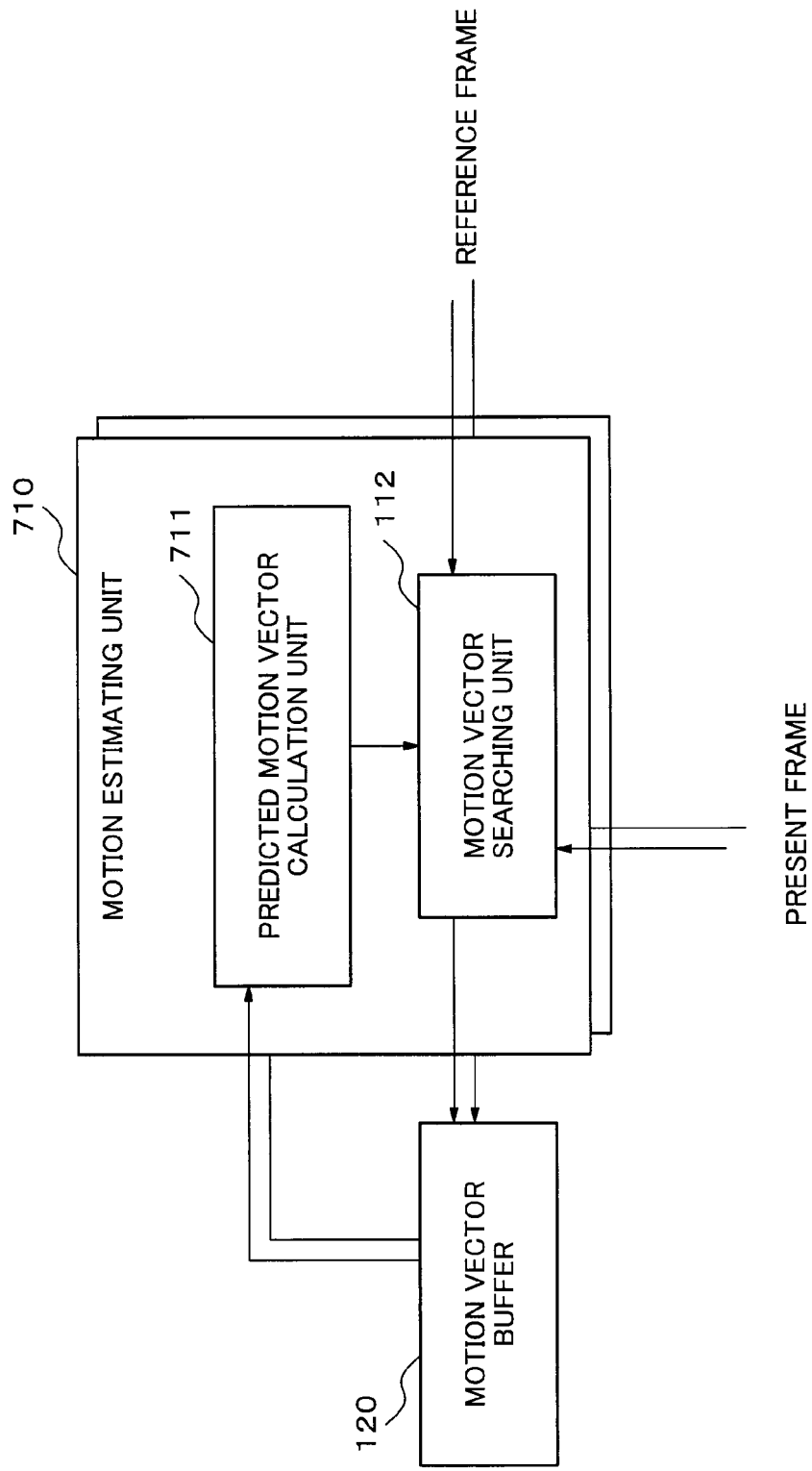
FIG. 34 is a block diagram for explaining a configuration of a parallel motion estimation device described in non-patent document 4.

The difference of the parallel motion estimation device 100 of this exemplary embodiment shown in FIG. 1 from the parallel motion estimation device 700 of non-patent document 4 shown in FIG. 34 is as follows. That is, the pseudo predicted motion vector calculating unit 111 is connected to the motion vector searching unit 112 instead of the predicted motion vector calculation unit 711 in the parallel motion estimation device 700, in the parallel motion estimation device 100.

Thereby, because adjacent blocks can be processed in parallel, more numerous blocks can be processed in parallel. For example, when processing a full HD image of 1920×1080 pixels by dividing a block of 16×16 pixels, the number of blocks that can be processed in parallel is 60 for the parallel motion estimation device 700 (non-patent document 4). In contrast, the number of blocks that can be processed in parallel is 120 for the parallel motion estimation device 100 (this exemplary embodiment), and the number of blocks that can be processed in parallel becomes double. Therefore, in the environment in which parallel processing is possible by more processors than 60, this exemplary embodiment can reduce whole processing time compared with the background art (non-patent document 4, for example).

Figure 35:
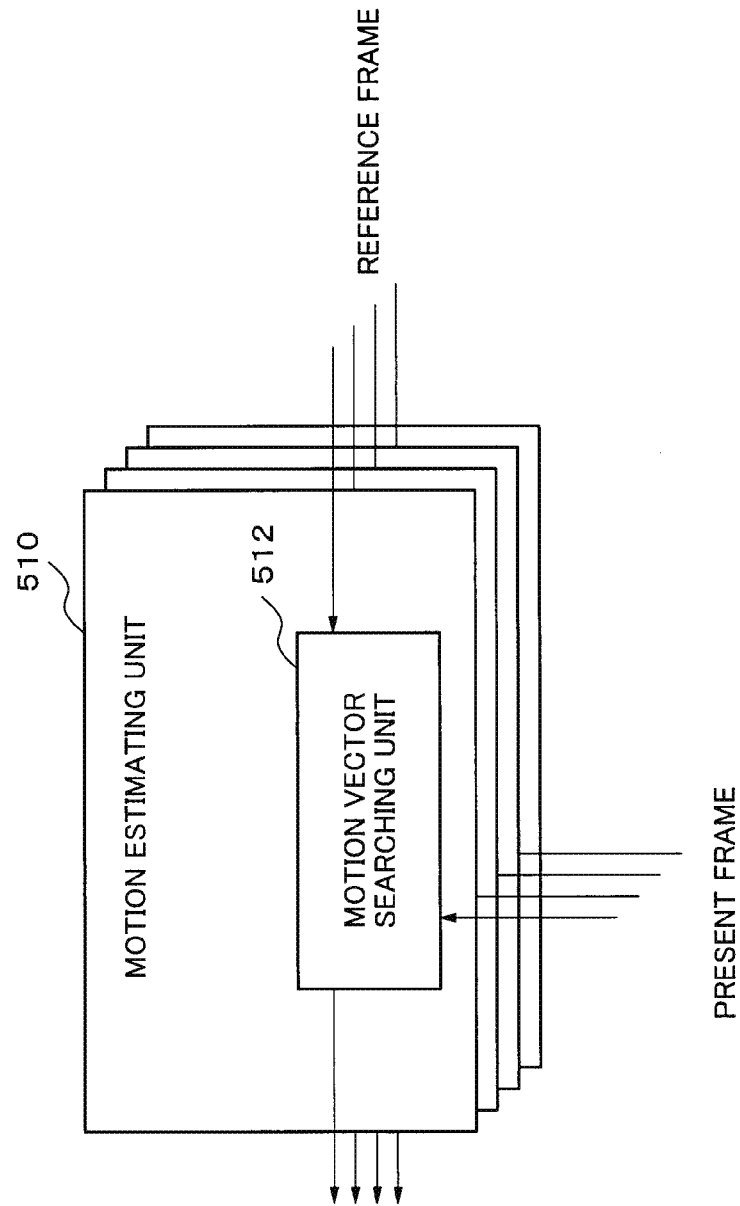
FIG. 35 is a block diagram for explaining a configuration of a parallel motion estimation device described in non-patent document 5.

The difference of the parallel motion estimation device 100 of this exemplary embodiment shown in FIG. 1 from the parallel motion estimation device 500 of non-patent document 5 shown in FIG. 35 is as follows. That is, the motion vector searching unit 112 is connected to the pseudo predicted motion vector calculating unit 111 which does not exist in the parallel motion estimation device 500, in the parallel motion estimation device 100. Thereby, the motion vector searching unit 112 can search a motion vector by using a predicted motion vector although is a pseudo predicted motion vector. Therefore, a highly precise motion vector can be calculated.

Figure 36:
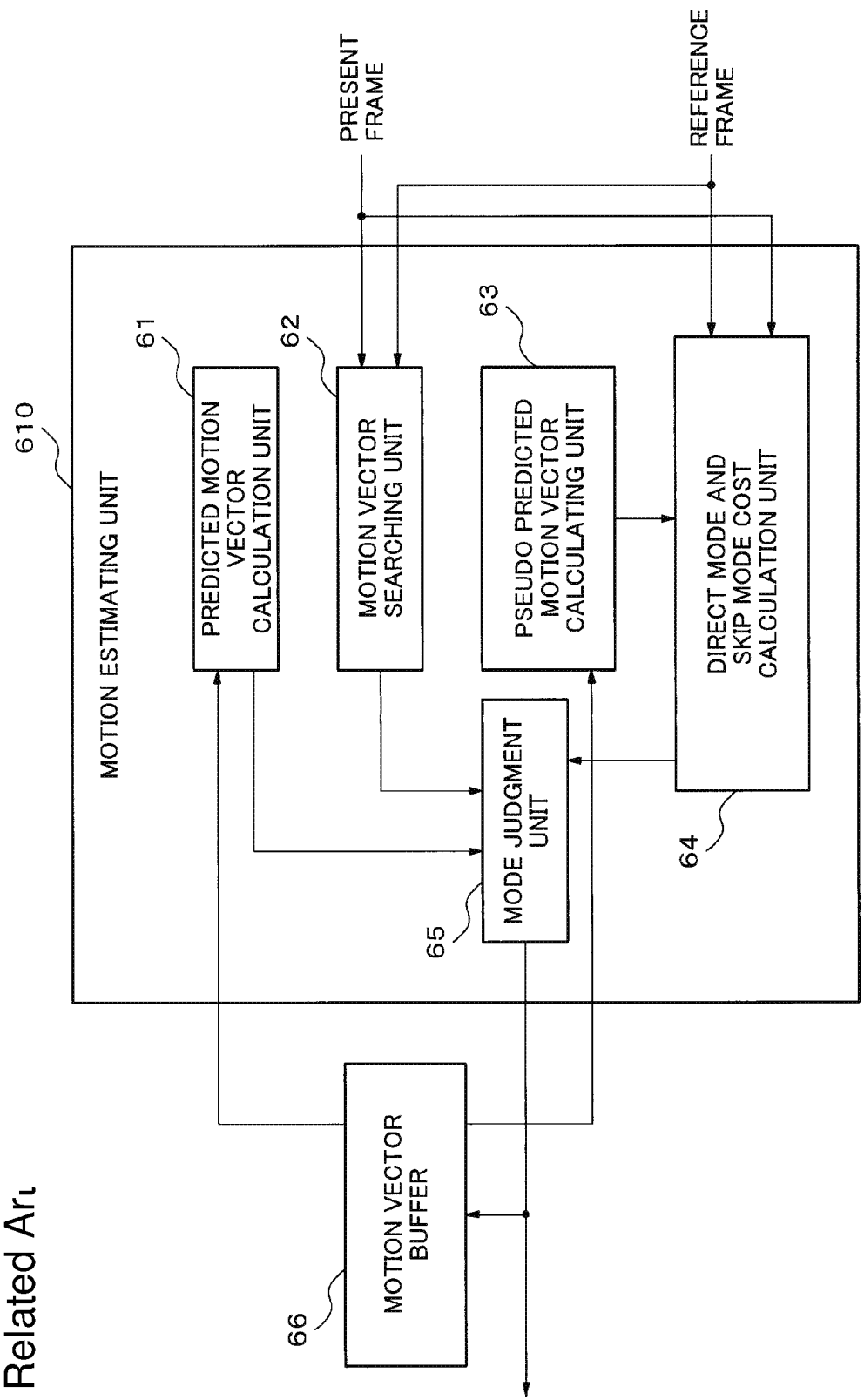
FIG. 36 is a block diagram for explaining a configuration of a parallel motion estimation device described in patent document 1.
Figure 37:
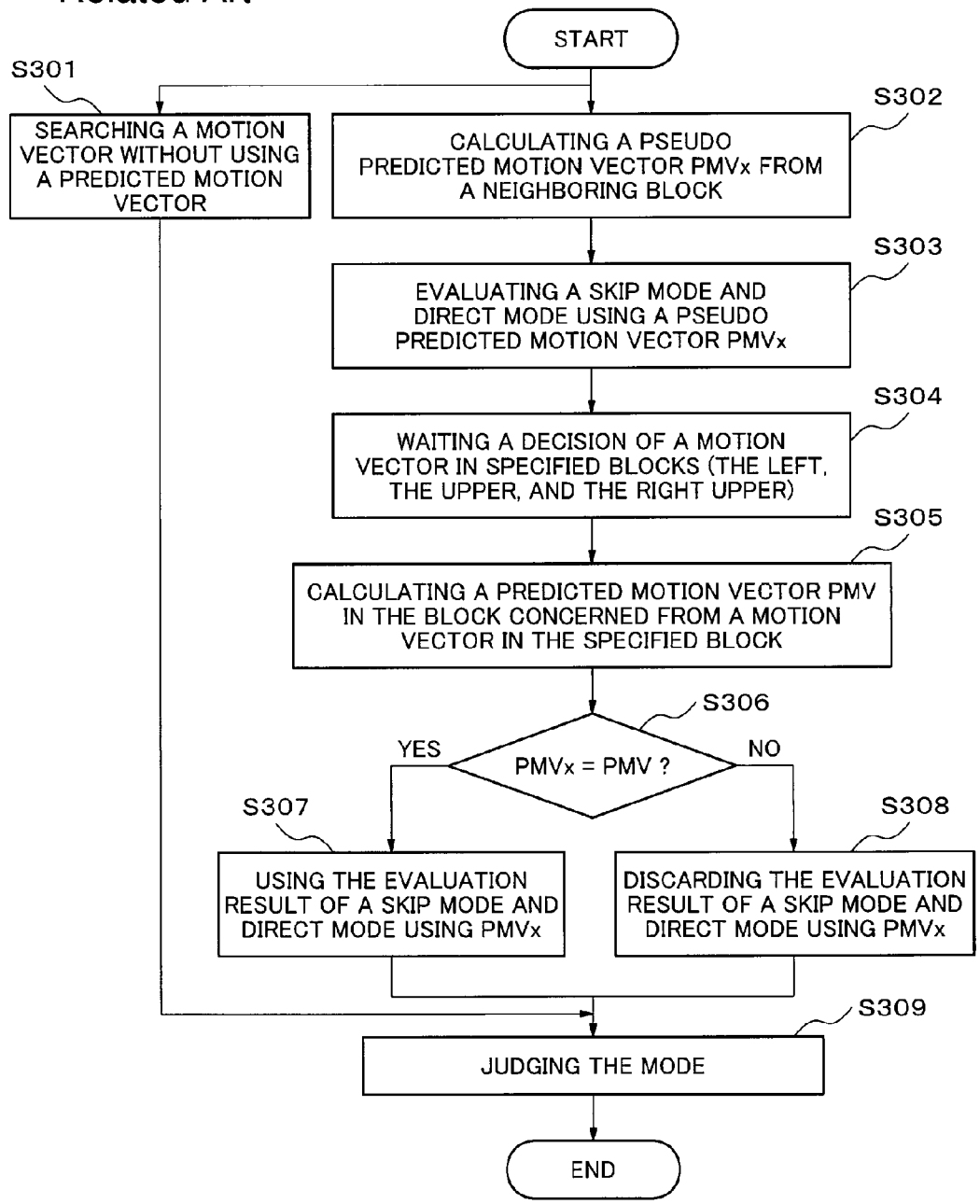
FIG. 37 is a flow chart for explaining operation of the parallel motion estimation device shown in FIG. 36.

The difference of the parallel motion estimation device 100 of this exemplary embodiment shown in FIG. 1 from the parallel motion estimation device 600 of patent document 1 shown in FIG. 36 is as follows. That is, the predicted motion vector calculation units 61 of the parallel motion estimation device 600 does not exist in the parallel motion estimation device 100, and the pseudo predicted motion vector calculating unit 111 is connected to the motion vector searching unit 112. In the motion estimating unit 610 of FIG. 36, the predicted motion vector calculation unit 61 needs to wait for the ending of all motion estimation for the blocks A, B and C. However, a predicted motion vector does not need to be calculated after waiting for all processes of the blocks A, B and C in this exemplary embodiment. Accordingly, because adjacent blocks can be processed in parallel, more numerous blocks can be processed in parallel.

In summary, according to the first exemplary embodiment, it is possible to calculate a large number of motion vectors in parallel and to improve motion vector accuracy.

[Second Exemplary Embodiment]

FIG. 9 is an example of a range where a block position which a parallel motion estimation device in a second exemplary embodiment uses for a vector prediction exists.

In the second exemplary embodiment, the processing is performed to a position (x,y) of a processing object block X among processed blocks as follows. That is, a predicted motion vector is calculated in a simulated manner by using a block set (s, t and u are arbitrary positive integers) including all of one or more blocks belonging to respective areas of a same row, a same column, an upper direction, a left direction and a right direction of a block to be processed, and adjacent blocks are processed in parallel. Here, the same row means that x coordinate is x, that is, K in FIG. 9, the same column means that y coordinate is y, that is, M in FIG. 9, the upper direction means that y coordinate is y−u, that is, J in FIG. 9, the left direction means that x coordinate is x−s, that is, L in FIG. 9, and the right direction means that x coordinate is x+t, that is, N in FIG. 9.

For example, a pseudo predicted motion vector is calculated from a block set of F(x−2,y) (area K and L of FIG. 9), G(x,y−2) (areas J and M of FIG. 9) and H(x+1,y−3) (areas J and N of FIG. 9) shown in FIG. 10, and obliquely-adjacent blocks are processed in parallel as shown in FIG. 11.

A configuration of the motion estimating unit in this exemplary embodiment may be the same configuration as the motion estimating unit 110 (FIG. 1) of the first exemplary embodiment.

Figure 12:
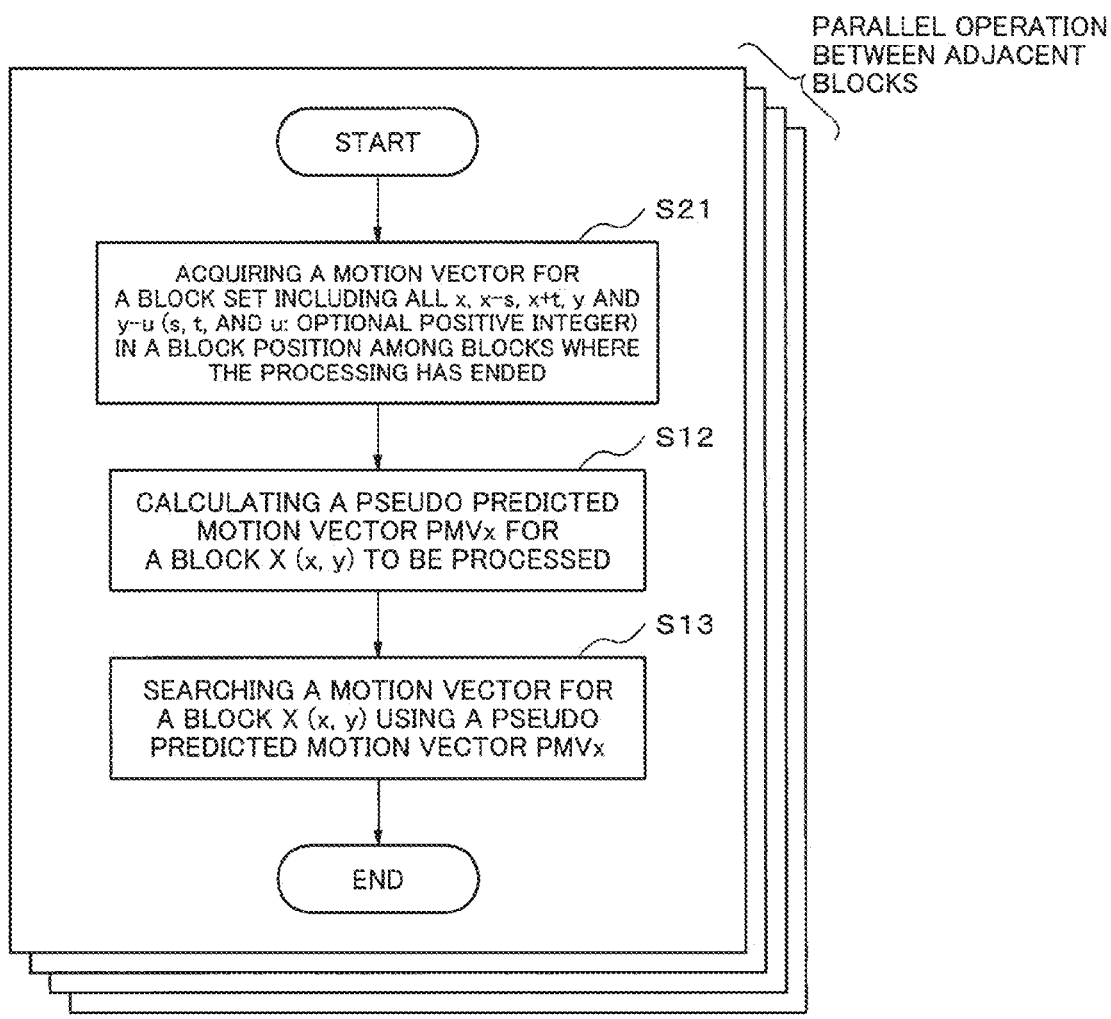
FIG. 12 is a flow chart showing an example of operation of the parallel motion estimation device in the second exemplary embodiment.

FIG. 12 is a flow chart showing an example of operation of the parallel motion estimation device in the second exemplary embodiment. The difference from the flow chart example (FIG. 2) in the first exemplary embodiment is that Step S21 is set instead of Step S11. In Step S21, the pseudo predicted motion vector calculating unit 111 acquires a motion vector of a block set which includes one or more blocks whose block positions are x, x−s, x+t, y, and y−u (s, t and u are arbitrary positive integers) among processed blocks, respectively.

Figure 13:
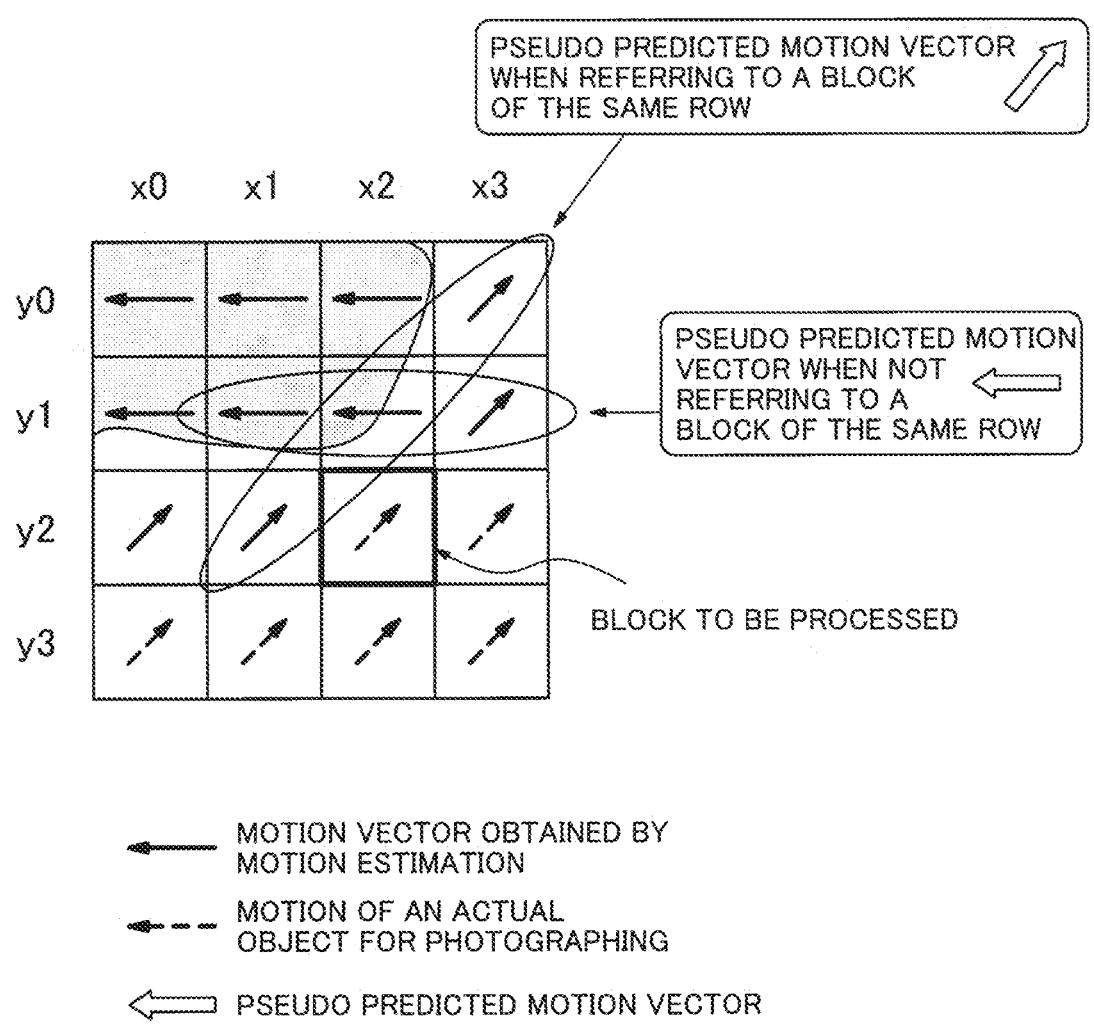
FIG. 13 is an example of a pseudo-motion vector of the parallel motion estimation device in the second exemplary embodiment.

In this exemplary embodiment, a pseudo predicted motion vector is calculated like the method of calculating an original predicted motion vector using a block set with all coordinates of a same row, a same column, an upper direction, a left direction and a right direction of a coding object block. Therefore, a vector predicted in a simulated manner approximates an original predicted motion vector. That is, precision of the vector cost is higher. For example, when a block of a same row is not referred to, when there is a boundary of an object in a lateral direction on the coding object block X as shown in FIG. 13, and it is different in a motion greatly between the blocks which straddled the boundary, the accuracy of the pseudo predicted motion vector may worsen. A processing object block (x2,y2) is located under the boundary of an object in the example of FIG. 13, and a motion of an object different from a processing object block is influential only referring to a block of an upper row, and a pseudo predicted motion vector different from a motion of an actual object of photographing may be calculated. Influence of motion of the same object as a processing object block can be enlarged by referring to the block of the same row such as (x1,y2) like this exemplary embodiment, and a pseudo predicted motion vector near the motion of an actual photographic object, that is, with high accuracy, can be calculated.

[Third Exemplary Embodiment]

A third exemplary embodiment of the present invention will be described. This exemplary embodiment operates to the position (x,y) of a coding object block X among blocks which can be referred to in the second exemplary embodiment as follows. That is, a motion vector is calculated using motion vectors of a block set including blocks A(x−1,y), B(x,y−1) and E(x+1,y−2) shown in FIG. 16.

Figure 15:
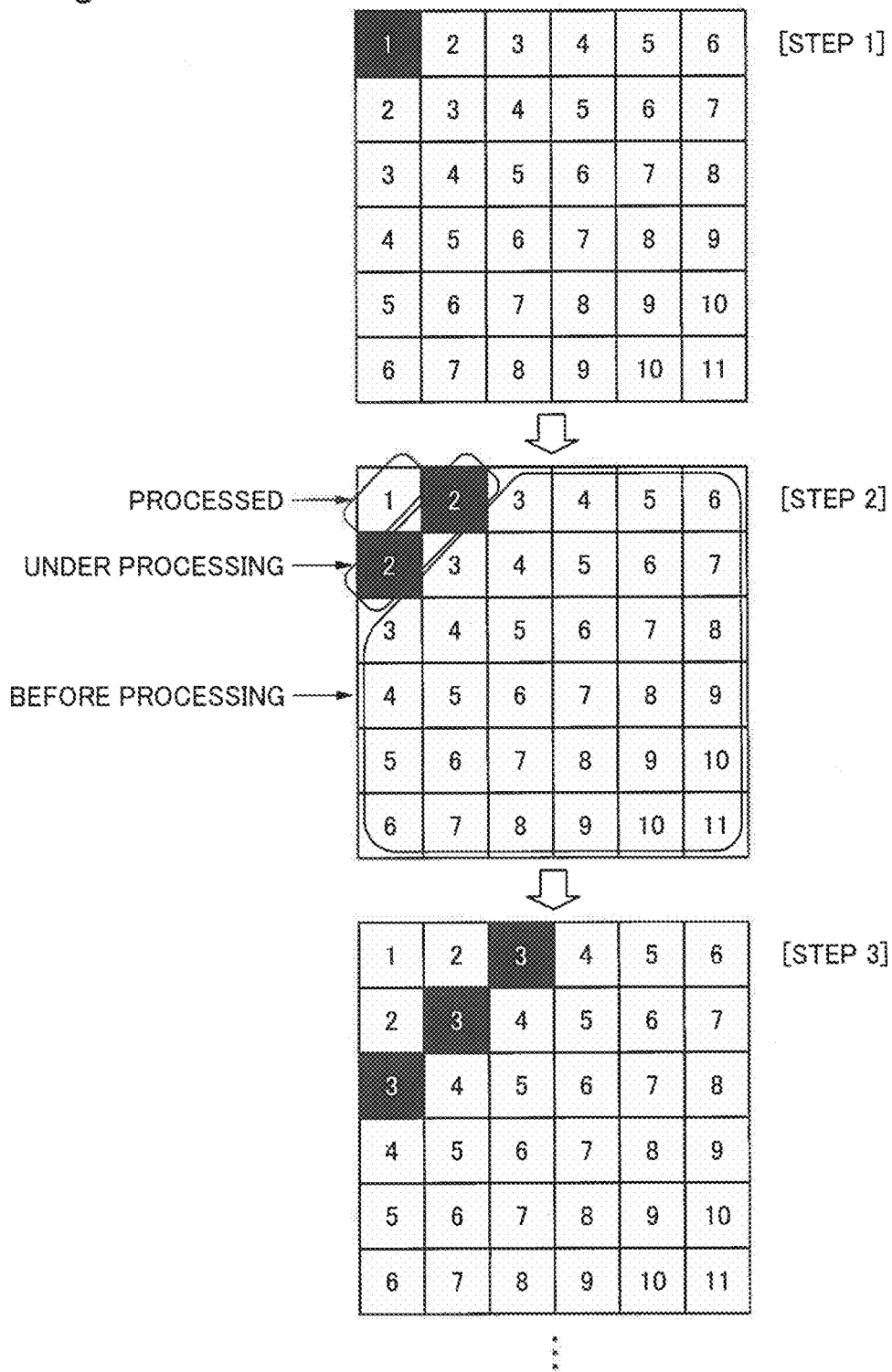
FIG. 15 is a parallel processing order example of the parallel motion estimation device in the third exemplary embodiment.

And obliquely-adjacent blocks from the block near the upper left are processed in parallel as shown in FIG. 15. That is, first, the block which is in the upper leftmost and whose processing order is one is processed in Step 1. Next, as Step 2, two obliquely-adjacent blocks near the upper leftmost whose processing order is two are processed. The processing of the block whose processing order is one has ended at that time. And when the processing of the block whose processing order is two ends, then obliquely-adjacent blocks which are near the upper leftmost among unprocessed blocks and whose processing order is three are processed as Step 3. As a result, the reference blocks A(x−1,y), B(x,y−1) and E(x+1,y−2) will always have been processed earlier than the processing object block X.

A configuration of the motion estimating unit in this exemplary embodiment may be the same configuration as the motion estimating unit 110 (FIG. 1) of the first exemplary embodiment.

Figure 14:
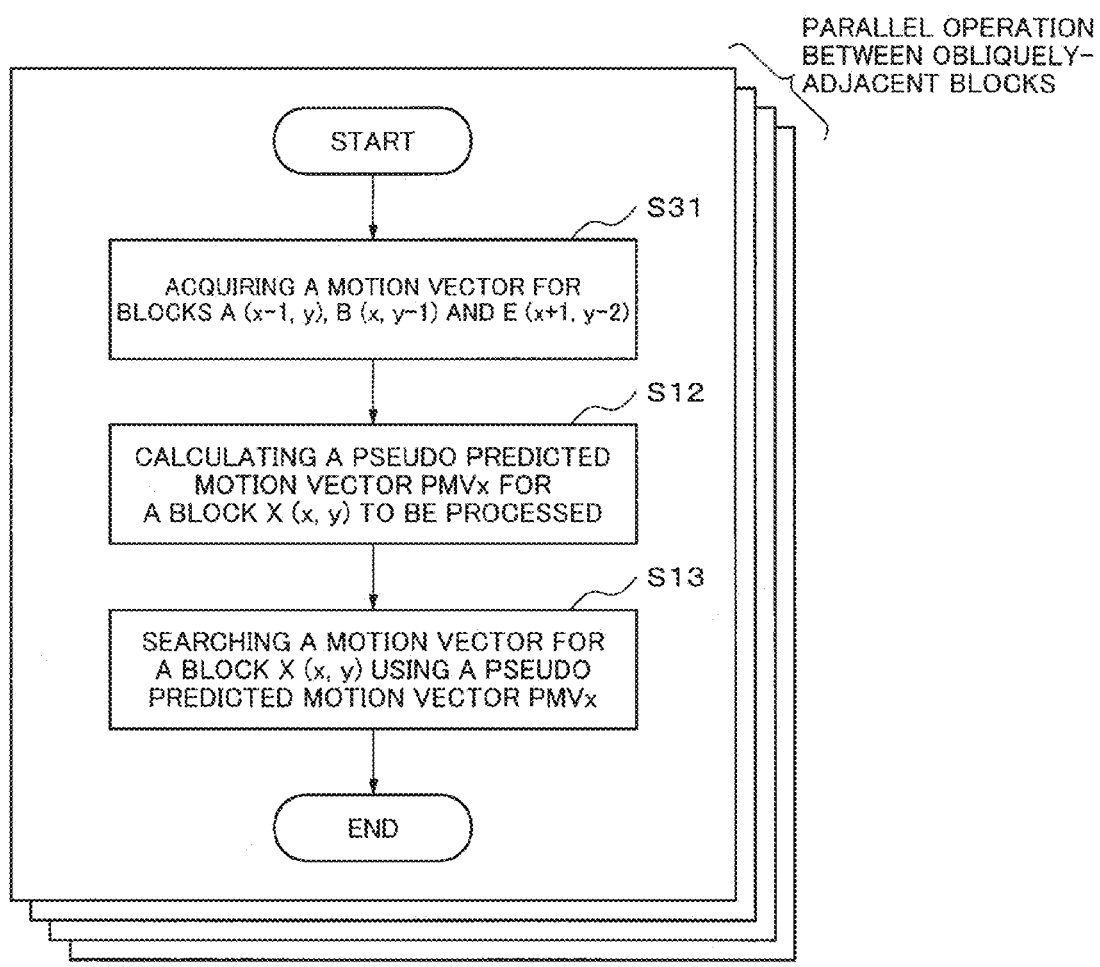
FIG. 14 is a flow chart showing an example of operation of a parallel motion estimation device in a third exemplary embodiment.

FIG. 14 is a flow chart showing an example of operation of the parallel motion estimation device in the third exemplary embodiment. The difference of FIG. 14 from the flow chart example (FIG. 12) in the second exemplary embodiment is that Step S31 is set for acquiring motion vectors of blocks A(x−1,y), B(x,y−1) and E(x+1,y−2) instead of Step S21.

In this exemplary embodiment, a pseudo predicted motion vector is calculated using the motion vector of the blocks A(x−1,y), B(x,y−1) and E(x+1,y−2). A video image generally has spatial correlativity with a motion vector. Accordingly, a highly precise pseudo predicted motion vector can be calculated by using a motion vector of a block with a closer distance. Therefore, because a highly precise pseudo predicted motion vector can be used by referring to a block of a position near a processing object block, a motion vector with high accuracy can be calculated.

[Fourth Exemplary Embodiment]

Figures 19, 20:
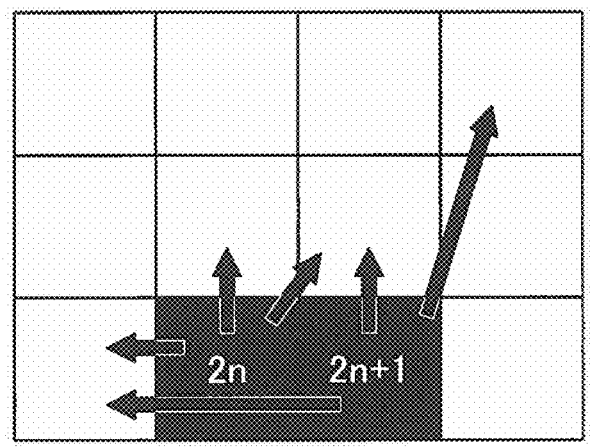
FIG. 19 is a block position example which the parallel motion estimation device in the fourth exemplary embodiment utilizes for a vector prediction.
FIG. 20 is a parallel processing order example of the parallel motion estimation device in the fourth exemplary embodiment.

A fourth exemplary embodiment of the present invention will be described. In this exemplary embodiment, a pseudo predicted motion vector is calculated using a motion vector, which has multiple patterns of a reference block set, of a block set pattern having a different relative position for every block. As an example, a pseudo predicted motion vector is calculated for a block (2n,y) of an even number (2n) column by referring to three blocks of (2n−1,y), (2n, y−1) and (2n+1,y−1) as shown in FIG. 19. As for a block (2n+1,y) of an odd number (2n+1) column, a pseudo predicted motion vector is calculated by referring to three blocks of (2n−1,y), (2n+1,y−1) and (2n+2,y+2). A pseudo predicted motion vector of an even numbered column is equal to an original predicted motion vector. The blocks which can be processed in parallel are laterally adjacent between an even numbered column and an odd numbered column, and obliquely adjacent between an odd numbered column and an even numbered column as shown in FIG. 20 in this example.

A configuration of the motion estimating unit in this exemplary embodiment may be the same configuration as the motion estimating unit 110 (FIG. 1) of the first exemplary embodiment.

Figure 18:
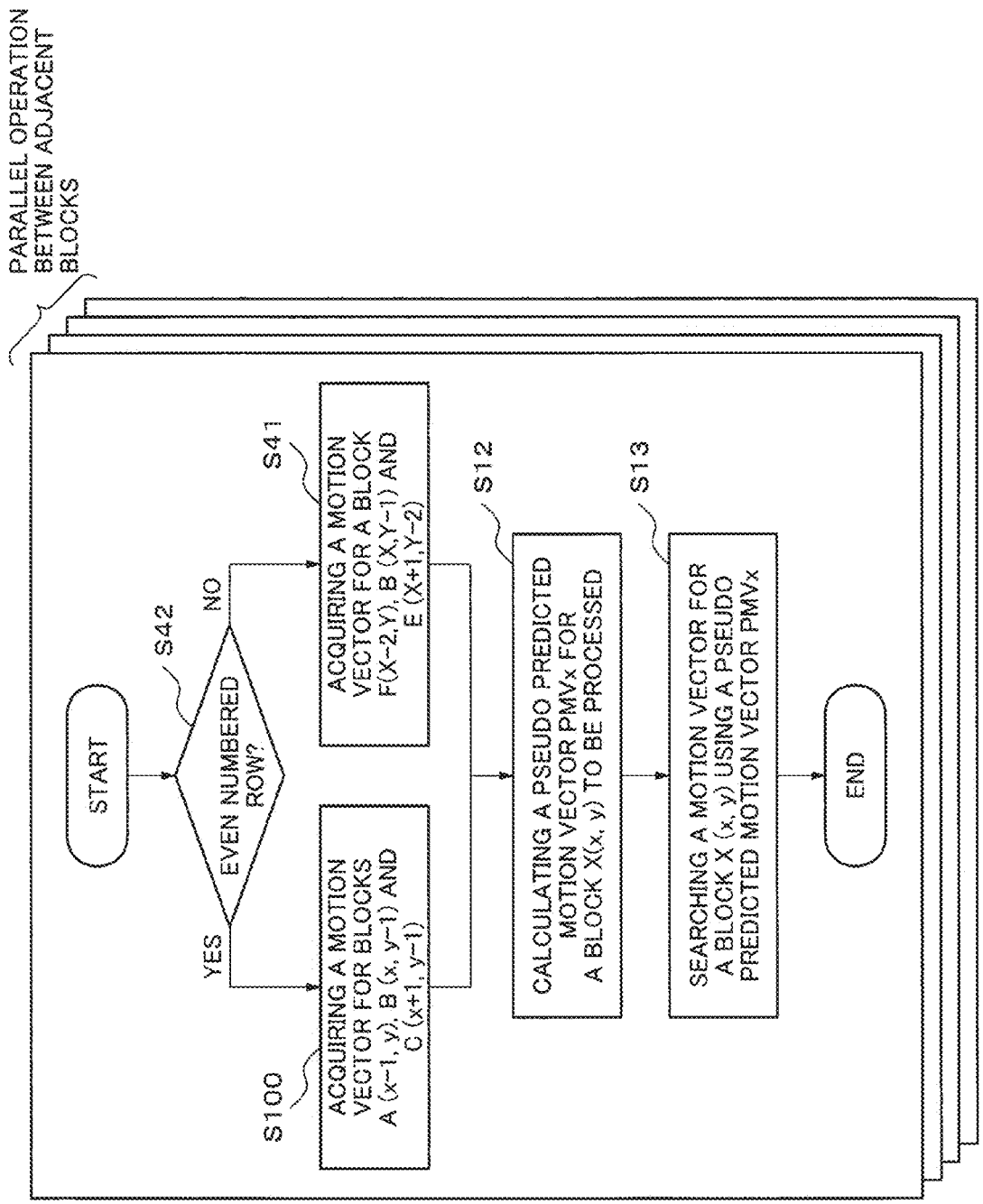
FIG. 18 is a flow chart showing an example of operation of a parallel motion estimation device in a fourth exemplary embodiment.

FIG. 18 is a flow chart showing an example of operation of the parallel motion estimation device in the fourth exemplary embodiment. In this exemplary embodiment, the pseudo predicted motion vector calculating unit 111 judges whether a processing object block X is in an even numbered column or an odd numbered column (Step S42). When the processing object block X is in an even numbered column, the pseudo predicted motion vector calculating unit 111 acquires motion vectors of blocks A(x−1,y), B(x,y−1) and C(x+1,y−1) (Step S100). On the other hand, when the processing object block X is in an odd numbered column, the pseudo predicted motion vector calculating unit 111 acquires motion vectors of blocks F(x−2,y), B(x,y−1) and E(x+1,y−2) (Step S41). The pseudo predicted motion vector calculating unit 111 calculates a pseudo predicted motion vector PMVx of a processing object block X using the acquired motion vector (Step S12). The motion vector searching unit 112 searches a motion vector using the pseudo predicted motion vector PMVx (Step S13).

In this exemplary embodiment, a pseudo predicted motion vector equal to an original predicted motion vector can be used at a certain block, processing in parallel adjacent blocks. Therefore, a precision of a calculated motion vector can be improved.

[Fifth Exemplary Embodiment]

A fifth exemplary embodiment of the present invention will be described. In this exemplary embodiment, when a pseudo predicted motion vector is calculated, a motion vector referred to is selected adaptively. A fifth exemplary embodiment of the present invention will be described more in detail as follows. Compression coding of a block is performed using an intra prediction in video image compression coding, and there are no motion vectors for the block in the case. Accordingly, in this exemplary embodiment, when an intra prediction is performed for a block referred to when a pseudo predicted motion vector is calculated, a motion vector of other block is used.

Figure 21:
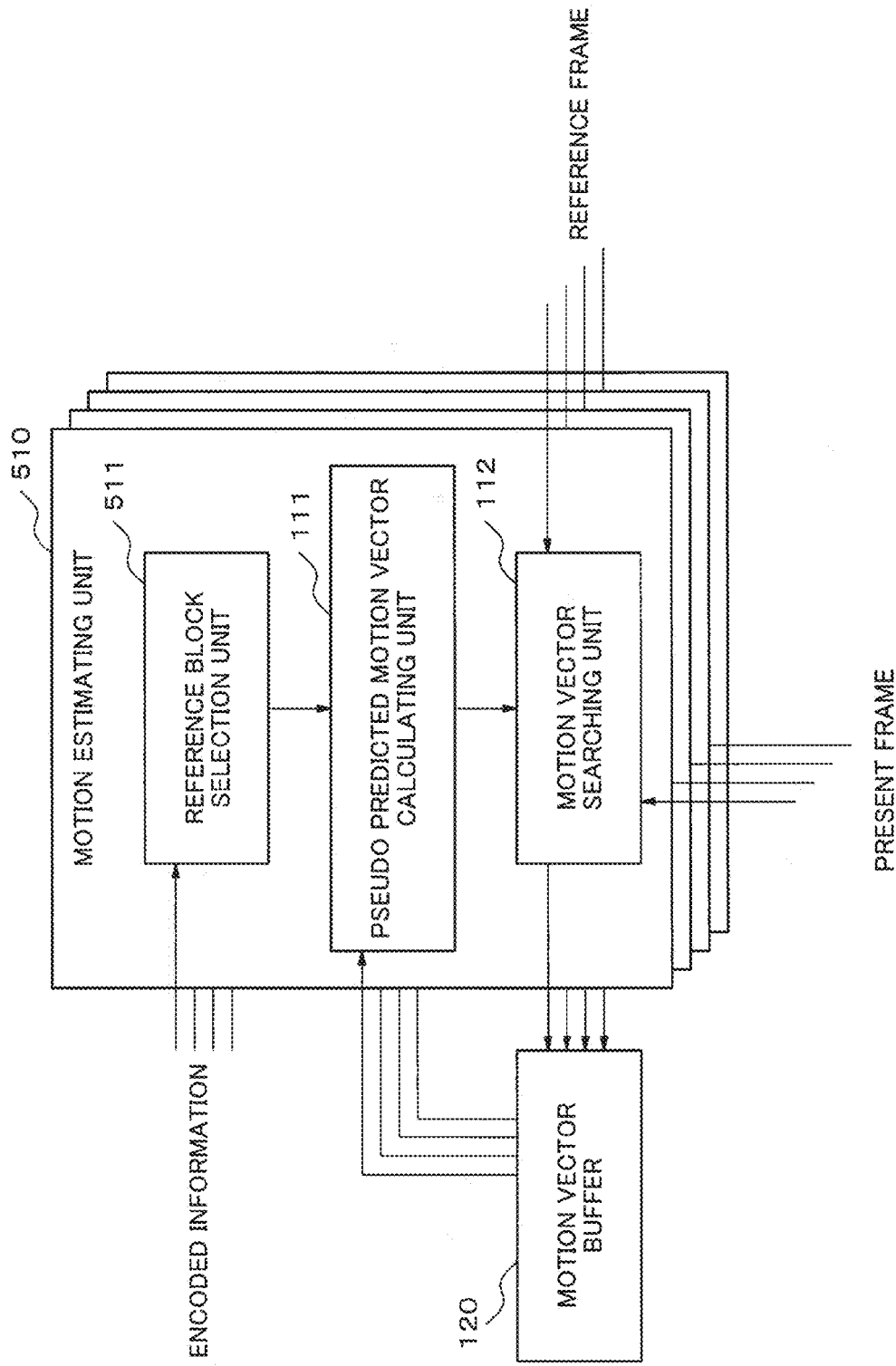
FIG. 21 is a block diagram showing an exemplary configuration of a parallel motion estimation device in a fifth exemplary embodiment.

FIG. 21 is a block diagram showing an exemplary configuration of a parallel motion estimation device 550 in a fifth exemplary embodiment. A motion estimating unit 510 of which the parallel motion estimation device 550 is composed further includes a reference block selection unit 511, and the reference block selection unit 511 makes the encoded information on a block an input.

Figure 22:
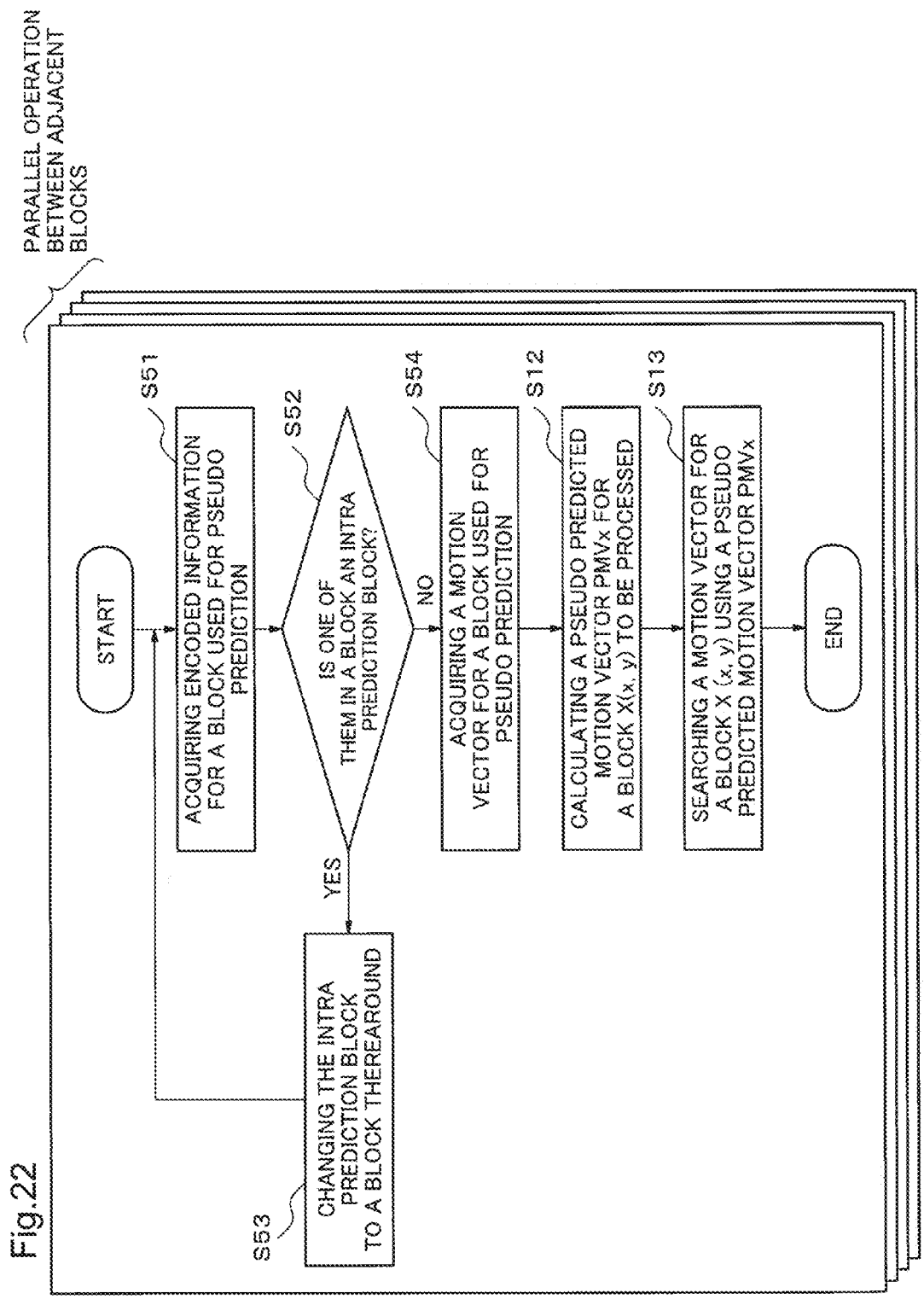
FIG. 22 is a flow chart showing an example of operation of the parallel motion estimation device in the fifth exemplary embodiment.

FIG. 22 is a flow chart showing an example of operation of the parallel motion estimation device 550. The reference block selection unit 511 acquires encoded information on blocks, for example blocks A (x−1,y), B (x,y−1) and E (x+1,y−2), used for a prediction (Step S51). The reference block selection unit 511 judges whether compression coding of any one of blocks A, B and E is performed by an intra prediction (Step S52). When the intra prediction is used, the reference block selection unit 511 selects a block therearound instead of the intra predicted block, an upper block, for example (Step S53). These processing are continued until all blocks are no longer intra prediction blocks. The pseudo predicted motion vector calculating unit 111 acquires a motion vector of a block which the reference block selection unit 511 selected (Step S54) and calculates a predicted motion vector (Step S12). The motion vector searching unit 112 searches a motion vector using the pseudo predicted motion vector PMVx (Step S13).

In this exemplary embodiment, when a block referred to in the calculation of a pseudo predicted motion vector is an intra prediction, the pseudo predicted motion vector is calculated using the block therearound. Accordingly, the number of the motion vector used for a pseudo-vector prediction does not decrease, and a more accurate pseudo predicted motion vector can be calculated.

[Sixth Exemplary Embodiment]

A sixth exemplary embodiment of the present invention will be described. In this exemplary embodiment, a motion vector used for calculating a pseudo predicted motion vector is selected adaptively like the fifth exemplary embodiment. In this exemplary embodiment, a precision of a pseudo predicted motion vector is considered before motion vector search, and when an enough precision seems not to be obtained, a reference block is added. For example, when a reference block is an intra prediction and there is not a motion vector, or when direction or size of each motion vector of reference blocks is largely different, it is difficult to obtain a highly precise pseudo predicted motion vector.

Figure 23:
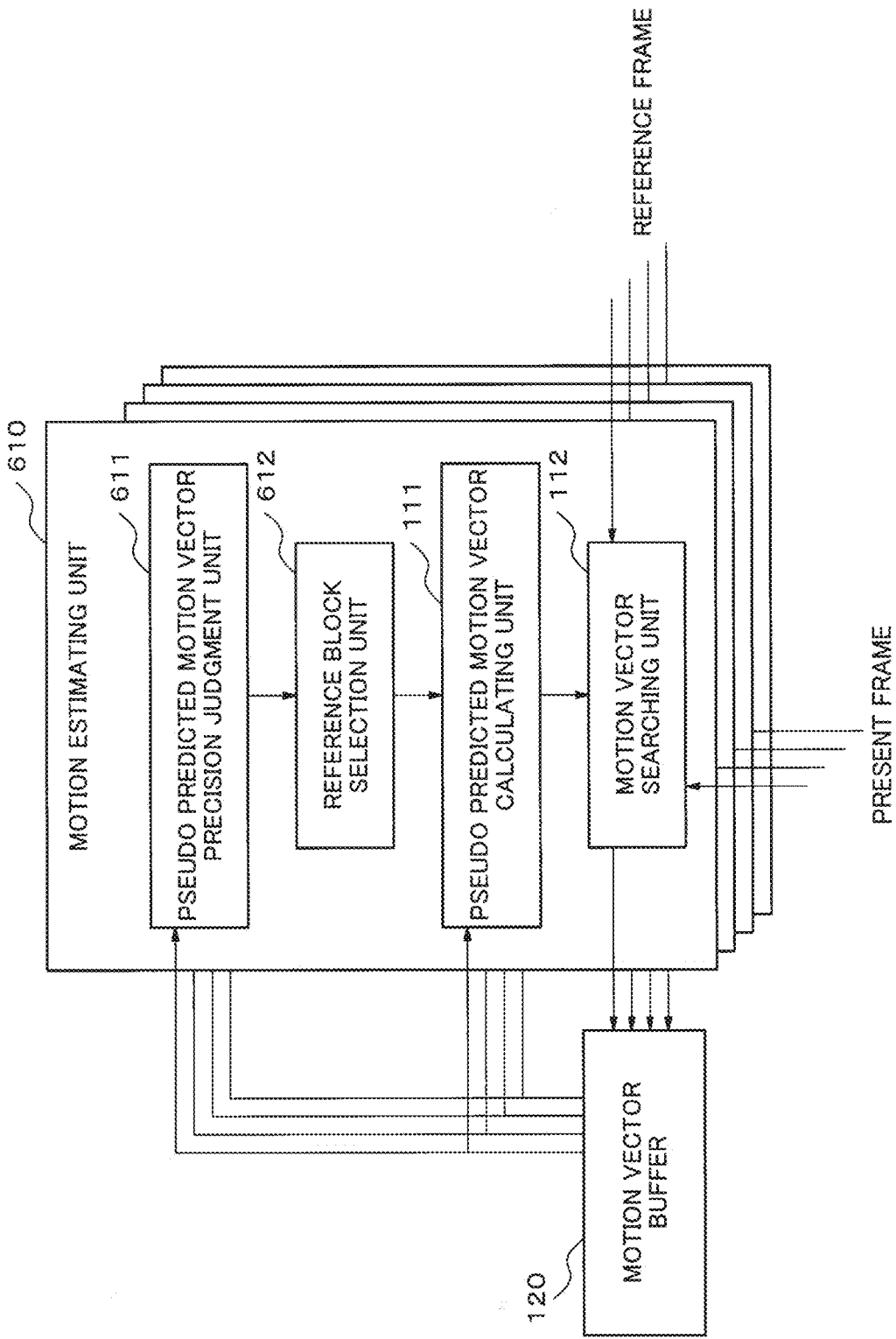
FIG. 23 is a block diagram showing an exemplary configuration of a parallel motion estimation device in a sixth exemplary embodiment.

FIG. 23 is a block diagram showing an exemplary configuration of a parallel motion estimation device 650 in a sixth exemplary embodiment. A motion estimating unit 610 of which the parallel motion estimation device 650 is composed further includes a pseudo predicted motion vector precision judgment unit 611. The pseudo predicted motion vector precision judgment unit 611 is connected with a reference vector selection unit 612.

Figure 24:
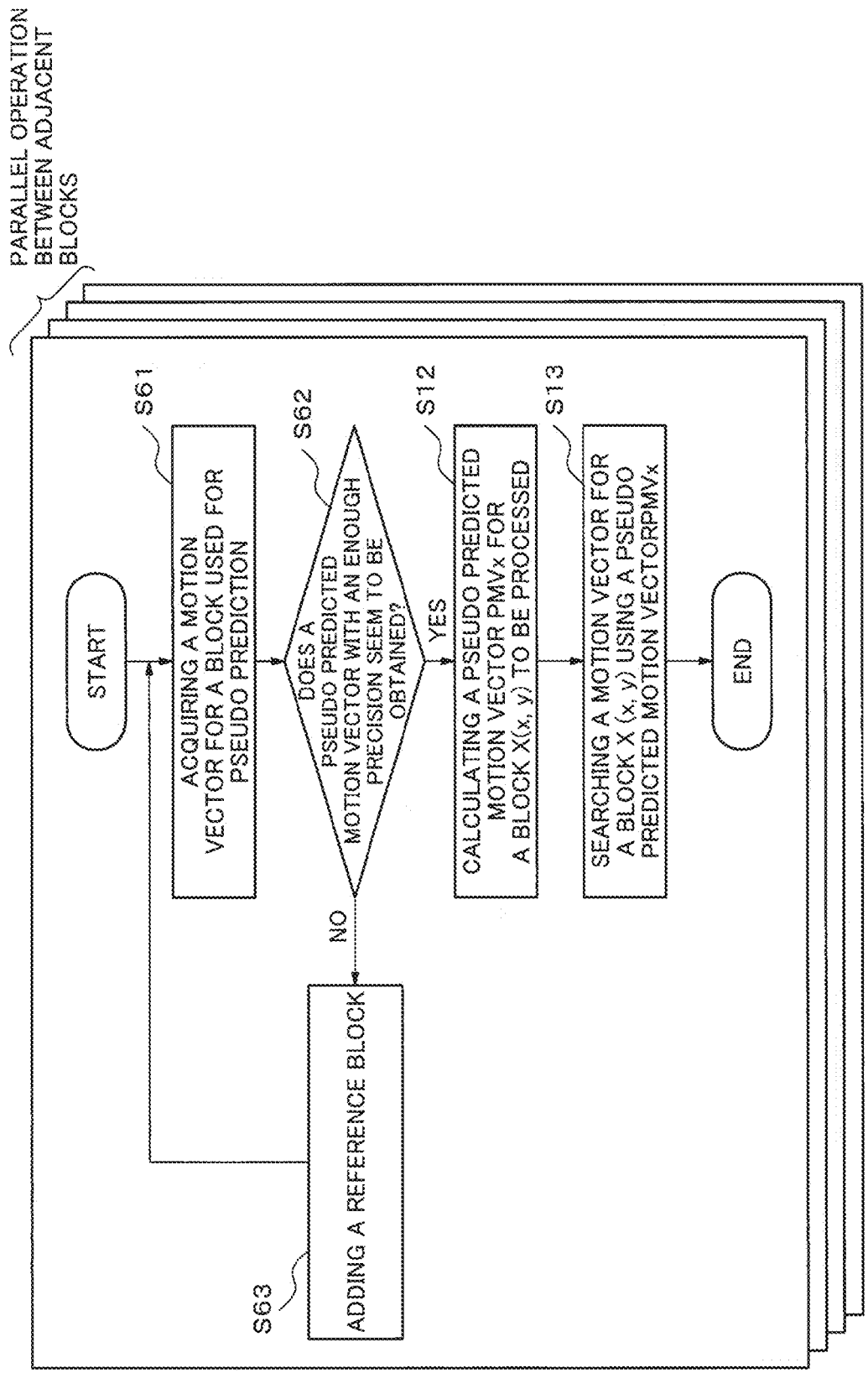
FIG. 24 is a flow chart showing an example of operation of the parallel motion estimation device in the sixth exemplary embodiment.

FIG. 24 is a flow chart showing an example of operation of the parallel motion estimation device 650 in the sixth exemplary embodiment. First, the pseudo predicted motion vector precision judgment unit 611 judges whether a precision of pseudo predicted motion vectors obtained from blocks A (x−1,y), B (x,y−1) and E (x+1,y−2), for example, is enough (Step S62). For example, when a precision of a obtained pseudo predicted motion vector is considered to be not enough because directions of three motion vectors are all vary widely, the reference block selection unit adds a block of the upper left among the adjacent blocks to the reference block (Step S63). These processes are repeated until the pseudo predicted motion vector precision judgment unit 611 judges that sufficient precision can be obtained so that the directions of respective vectors concentrate. The pseudo predicted motion vector calculating unit 111 acquires a motion vector of the block which the reference block selection unit 612 selected and calculates a pseudo predicted motion vector.

In this exemplary embodiment, a highly precise pseudo predicted motion vector can always be calculated because the pseudo predicted motion vector is calculated after being confirmed that a precision of the pseudo predicted motion vector is high enough.

[Seventh Exemplary Embodiment]

A seventh exemplary embodiment of the present invention will be described. This exemplary embodiment is a parallel video image encoding device including the motion estimating unit of the third exemplary embodiment. In video image coding by H.264, motion estimation, image processing of an intra prediction and a deblocking filter use a processing result of other blocks of the left and the upper. Therefore, the intra prediction and the deblocking filter also need to be processed after the processing of the block of the left and the upper ends.

Because the motion estimating unit of the third exemplary embodiment processes a processing object block after the processing of the block of the left and the upper ends, the intra prediction and the deblocking filter can also be processed in parallel by the similar processing order. In addition to a motion estimation process, the block coding process of the process group which can be processed in parallel by a block unit including image processing which refers to the processing result of the left and the upper block of the intra prediction and the deblocking filter, and the orthogonal transformation is performed.

Figure 25:
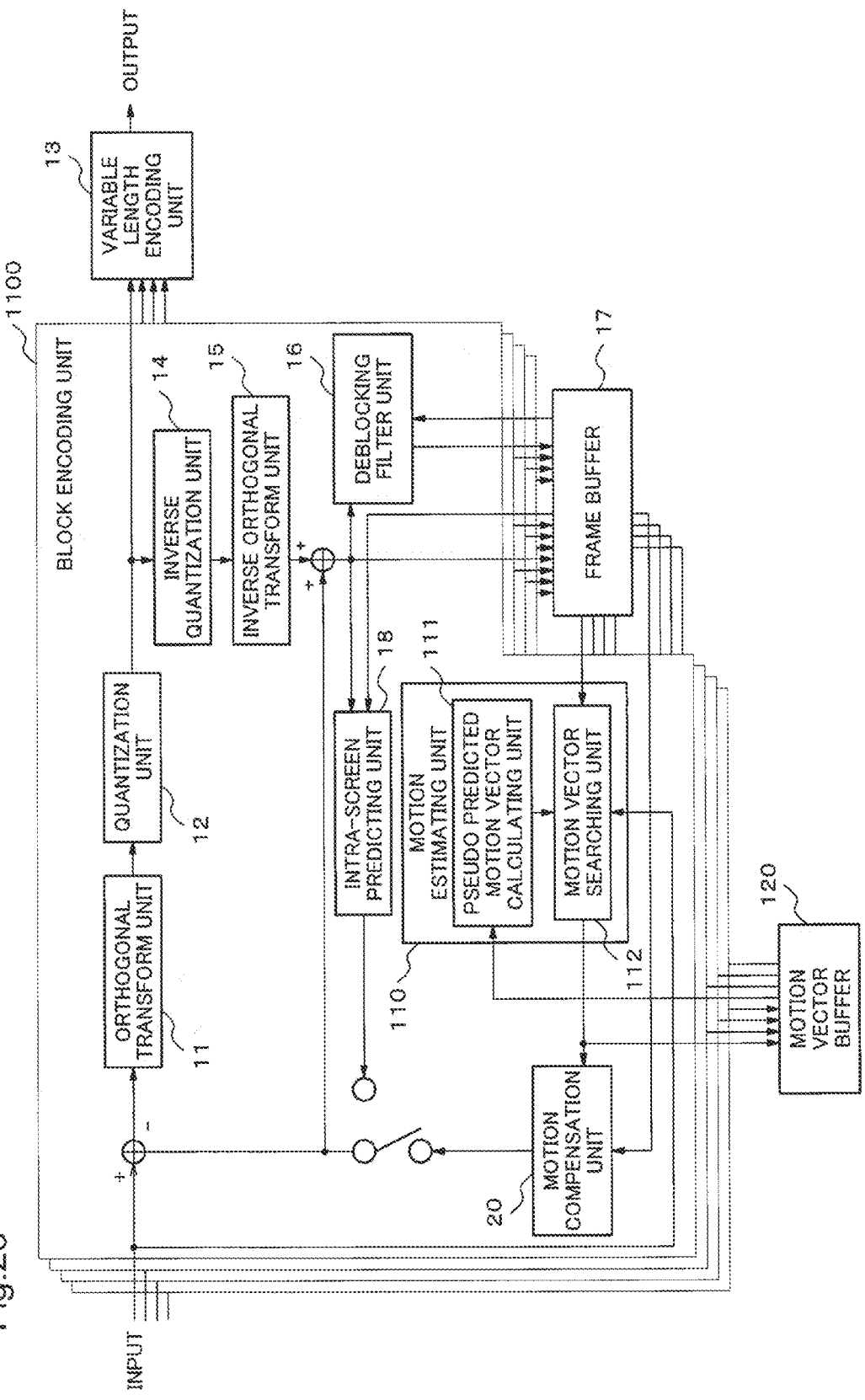
FIG. 25 is a block diagram showing an exemplary configuration of a parallel video image encoding device in a seventh exemplary embodiment.

FIG. 25 is a block diagram showing an exemplary configuration of a parallel video image encoding device 1000 in a seventh exemplary embodiment. The parallel video image encoding device 1000 includes a plurality of block encoding units 1100, a variable length encoding unit 13, a frame buffer 17 and a motion vector buffer 120 at least.

Each block encoding unit 1100 includes an orthogonal transform unit 11, a quantization unit 12, an inverse quantization unit 14, an inverse orthogonal transform unit 15, a deblocking filter unit 16, an intra predicting unit 18, a motion estimating unit 110 and a motion compensation unit 20. The motion estimating unit 110 includes a pseudo predicted motion vector calculating unit 111 and a motion vector searching unit 112.

The motion estimating unit 110 can be made the motion estimating unit 510 of the fifth exemplary embodiment or the motion estimating unit 610 of the sixth exemplary embodiment.

Figures 16, 17:
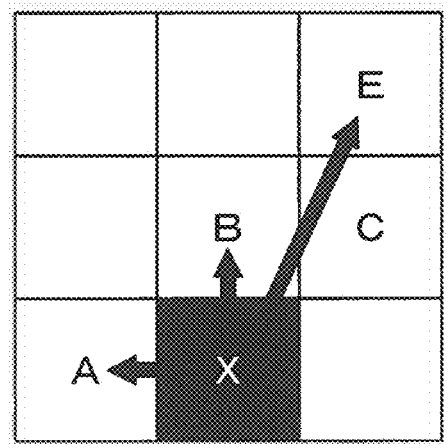
FIG. 16 is a block position example which the parallel motion estimation device in the third exemplary embodiment utilizes for a vector prediction.
FIG. 17 is a parallel processing order example of the parallel motion estimation device in the third exemplary embodiment.

The intra predicting unit 18 and the deblocking filter unit 16 are processing with reference to blocks of the left and the upper. The block encoding unit 1100 processes blocks adjacent obliquely from the block of the upper left in parallel as shown in FIG. 17. Although the orthogonal transform unit 11, the quantization unit 12, the inverse quantization unit 14, the inverse orthogonal transform unit 15 and the motion compensation unit 20 do not need processing results of other blocks, the deblocking filter unit 16 and the intra predicting unit 18 need the processing results of the blocks of the left and the upper.

The orthogonal transform unit 11 performs orthogonal transformation such as discrete cosine transform to a difference value of an input image and an estimated image. The quantization unit 12 quantizes transformation coefficient to which an orthogonal transformation is performed. The inverse quantization unit 14 performs inverse quantization of the transformation coefficient quantized in the quantization unit 12. The inverse orthogonal transform unit 15 performs inverse orthogonal transformation of the inverse quantized transformation coefficient. The deblocking filter unit 16 removes the distortion between the blocks of a decoded frame. At that time, because images of the blocks of the left and the upper are used, the image to which inverse orthogonal transformation is performed is stored in the frame buffer 17, and the process in the deblocking filter unit 16 is performed by taking out the images of the blocks of the left and the upper from the frame buffer. And an image from which the distortion between the blocks is removed is also stored in the frame buffer 17. The motion vector searching unit 112 inputs a pseudo predicted motion vector which the pseudo predicted motion vector calculating unit 111 calculated, an input image (current frame) and a reference frame image stored in the frame buffer 17 from which the block distortion is removed, and searches a motion vector. The motion vector which the motion vector searching unit 112 calculated is sent to the motion vector buffer 120. The pseudo predicted motion vector calculating unit 111 which processes other blocks calculates a pseudo predicted motion vector using a motion vector stored in the motion vector buffer 120. The motion compensation unit 20 generates an estimated image from the searched motion vector and the decoded image stored in a frame buffer from which the block distortion is already removed. The intra predicting unit 18 performs prediction processing of a decoded image to which an inverse orthogonal transformation is performed by using decoded images of the left and the upper blocks of the same frame which is stored in the frame buffer 17. The variable length encoding unit 13 codes the transformation coefficient quantized by the quantization unit 12 and outputs the coding result.

A flow chart example of the motion estimating unit in this exemplary embodiment can be shown by the same flow chart example as FIG. 14 of the third exemplary embodiment.

Figure 26:
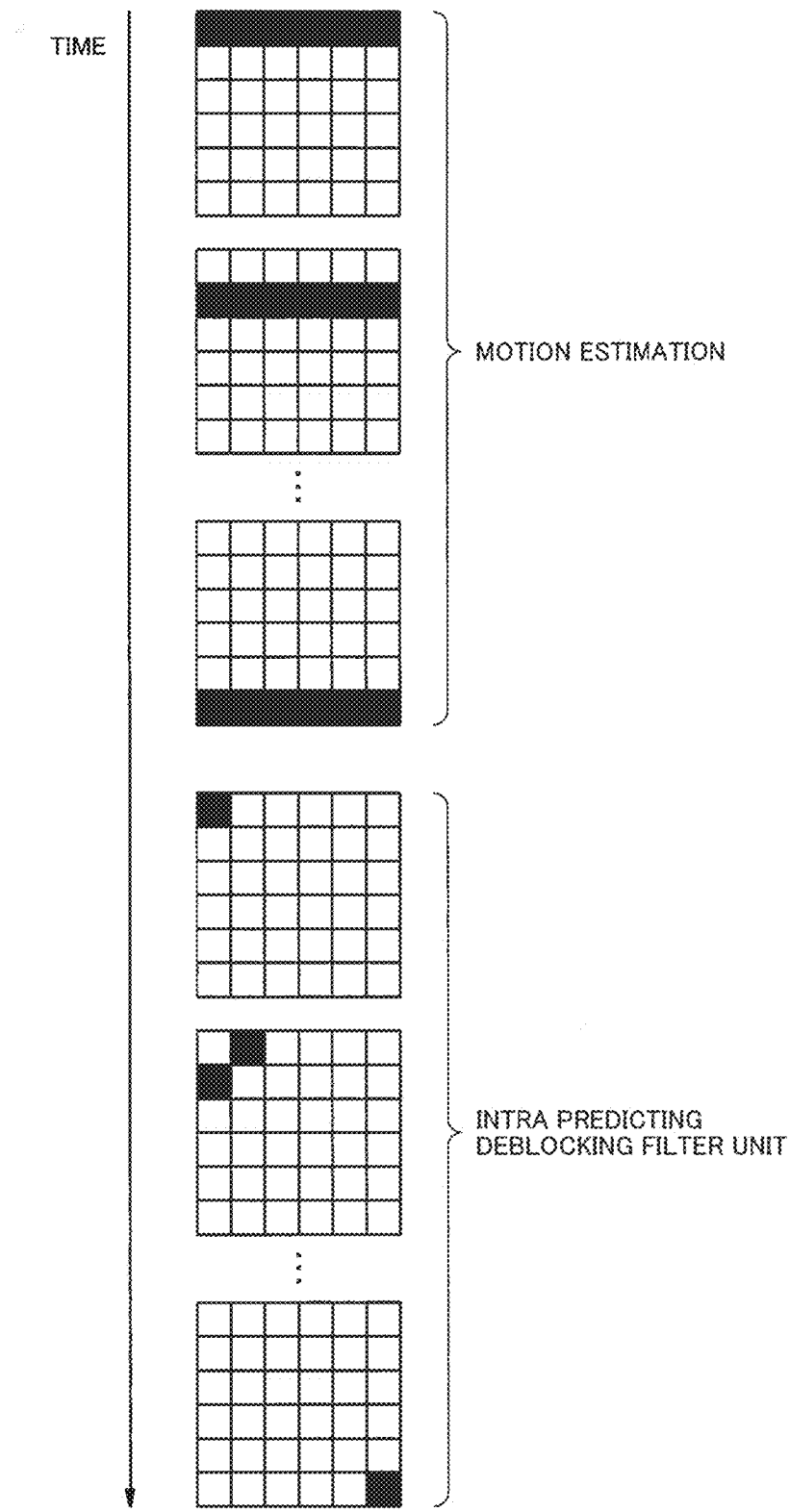
FIG. 26 is a diagram when motion estimation and a process of referring to the left and the upper are processed with different parallel processing order.
Figure 27:
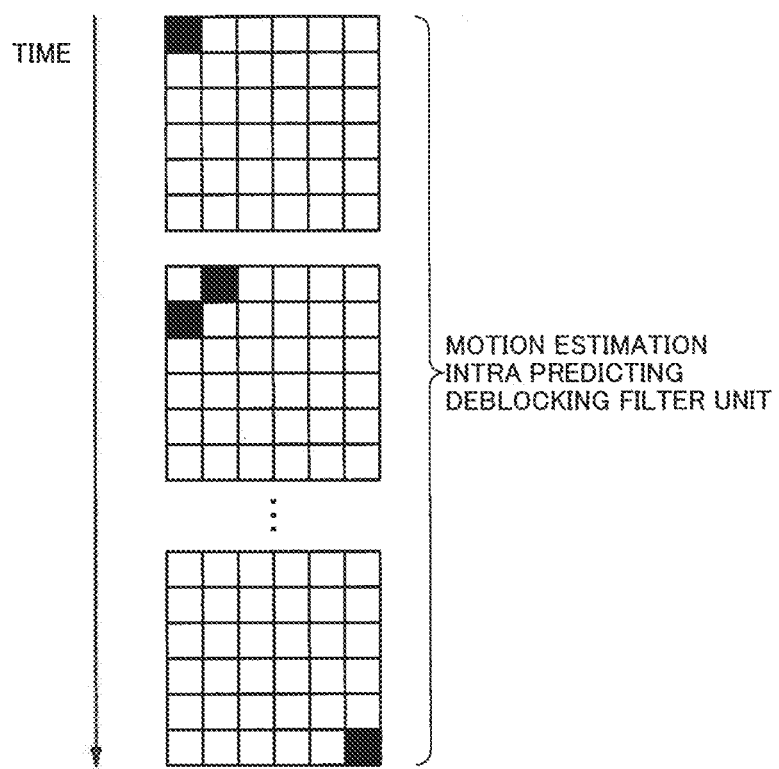
FIG. 27 is a diagram when motion estimation and a process of referring to the left and the upper are processed with the same parallel processing order.

When motion estimation is processed in parallel for the laterally adjacent blocks as shown in FIG. 4, for example, the intra predicting unit and the deblocking filter unit where the process of the left block needs to end first cannot be processed in parallel by the same processing order. Therefore, as shown in FIG. 26, the intra prediction and the deblocking filter need to be processed with the different parallel processing order after the motion estimation for one frame is processed, for example. In this exemplary embodiment, the motion estimating unit is processed in parallel between the obliquely adjacent blocks as shown in FIG. 17. Accordingly, as shown in FIG. 27, a motion estimation, an intra prediction and a deblocking filter of the same block can be processed with the same parallel processing order successively. Thereby, reducing initial overhead for starting parallel processing, synchronous processing, the data transfer between processes become possible.

Each exemplary embodiment of the first to the seventh exemplary embodiments which have been described above is a preferred exemplary embodiment of the present invention, and the scope of the present invention is not limited to only those exemplary embodiments, and it is possible to operate modes in which various change are performed in the range which does not deviate from the outline of the present invention.

Although the pseudo predicted motion vector is calculated from a vector of three blocks, the vector prediction may be performed using motion vectors of no more than two blocks or no smaller than four blocks. A plurality of blocks may be packed to make one parallel processing unit, and parallel processing of the adjacent process units may be performed. The present invention can be applied by also gathering two blocks into one parallel processing unit in case of MBAFF (Macroblock-adaptive frame-field) coding.

EXAMPLE

Next, operation of the mode for carrying out the present invention using a concrete example will be described. In this example, a motion estimation of H.264 encoding is processed in parallel using a GPU (Graphics Processing Unit), and the motion estimation in a 16×16 pixel macro block is made a parallel processing unit. Obliquely adjacent macro blocks are processed in parallel in this example, and a pseudo predicted motion vector of a processing object block is calculated using motion vectors in blocks A, B and E shown in FIG. 10.

It is assumed that the configuration of this example is equal to the configuration shown in FIG. 1. The motion estimation device 110 in the example operates in parallel on a GPU. The GPU is a 3D-Graphics processing processor and characterized by installing several ten cores to several hundreds cores therein compared with a multi-core CPU (Central Processing Unit) of several cores to several tens cores.

Figure 28:
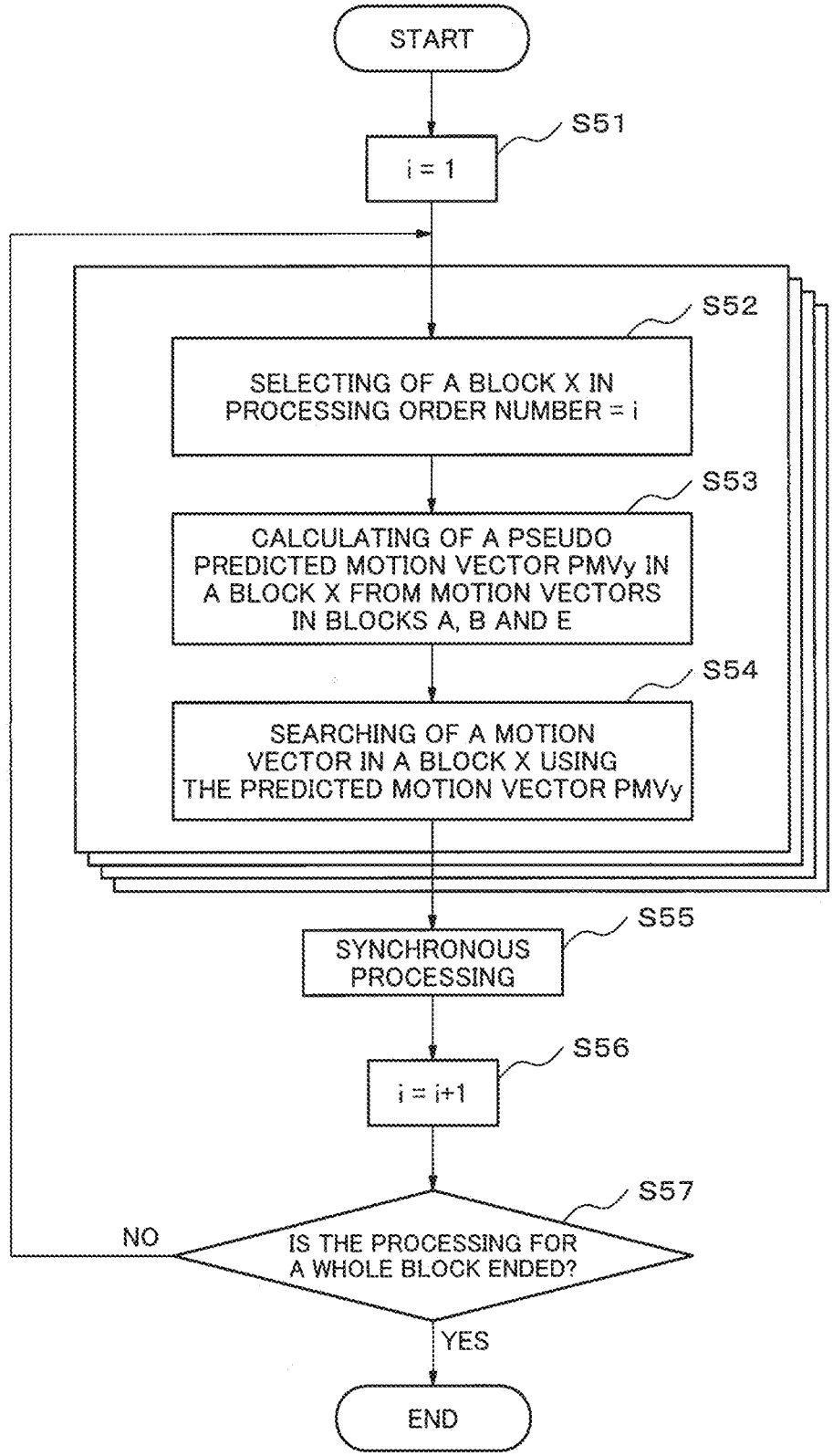
FIG. 28 is a flow chart showing an example of operation of a motion estimating unit of a parallel video image encoding device in an example of the present invention.

Next, a flow chart of processing of this example when performing motion estimation processing of one frame is shown in FIG. 28. Here, it is assumed that a processing order number like number 1-11 of FIG. 17 is given to each macro block. First, the motion estimating unit 110 initializes the variable i to 1 (Step S51), and selects a block X from a block of the processing order number i (Step S52). The pseudo predicted motion vector calculating unit 111 calculates a predicted motion vector from blocks A, B and E of FIG. 16 (Step S53). The motion vector searching unit 112 searches a motion vector using the calculated pseudo predicted motion vector (Step S54). Here, Steps S52 to S54 operate in parallel on a plurality of cores. And the end of all the processes of the blocks with the processing order number i is waited (Step S55). When the variable i is incremented (Step S56), and the process of any block has not ended (in Step S57, No judgment), the motion estimating unit 110 repeats Steps S52 to S57.

Figure 29:
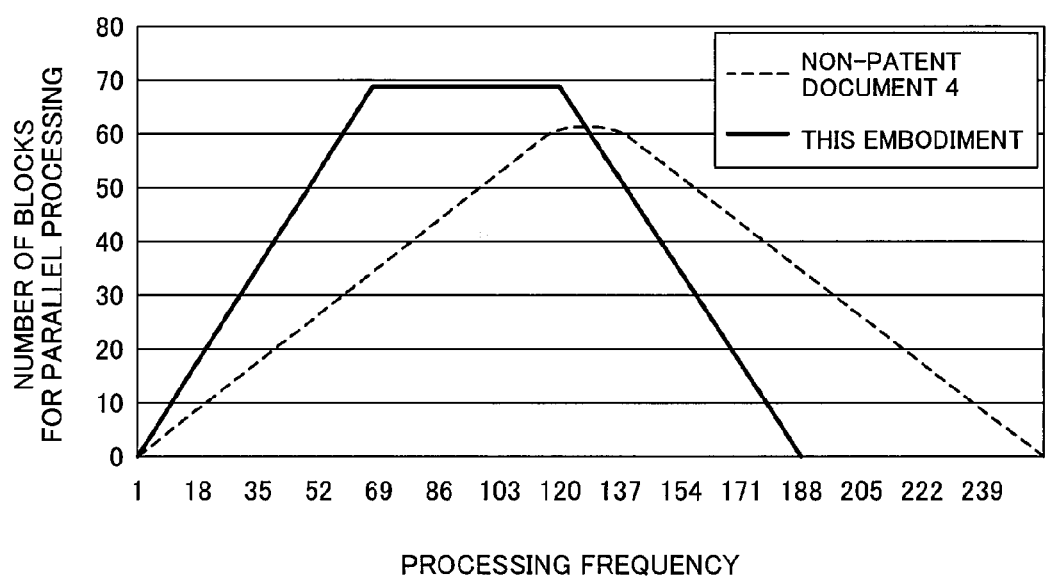
FIG. 29 is a graph showing the difference in the processing frequencies of non-patent document 4 and this example.
Figure 30:
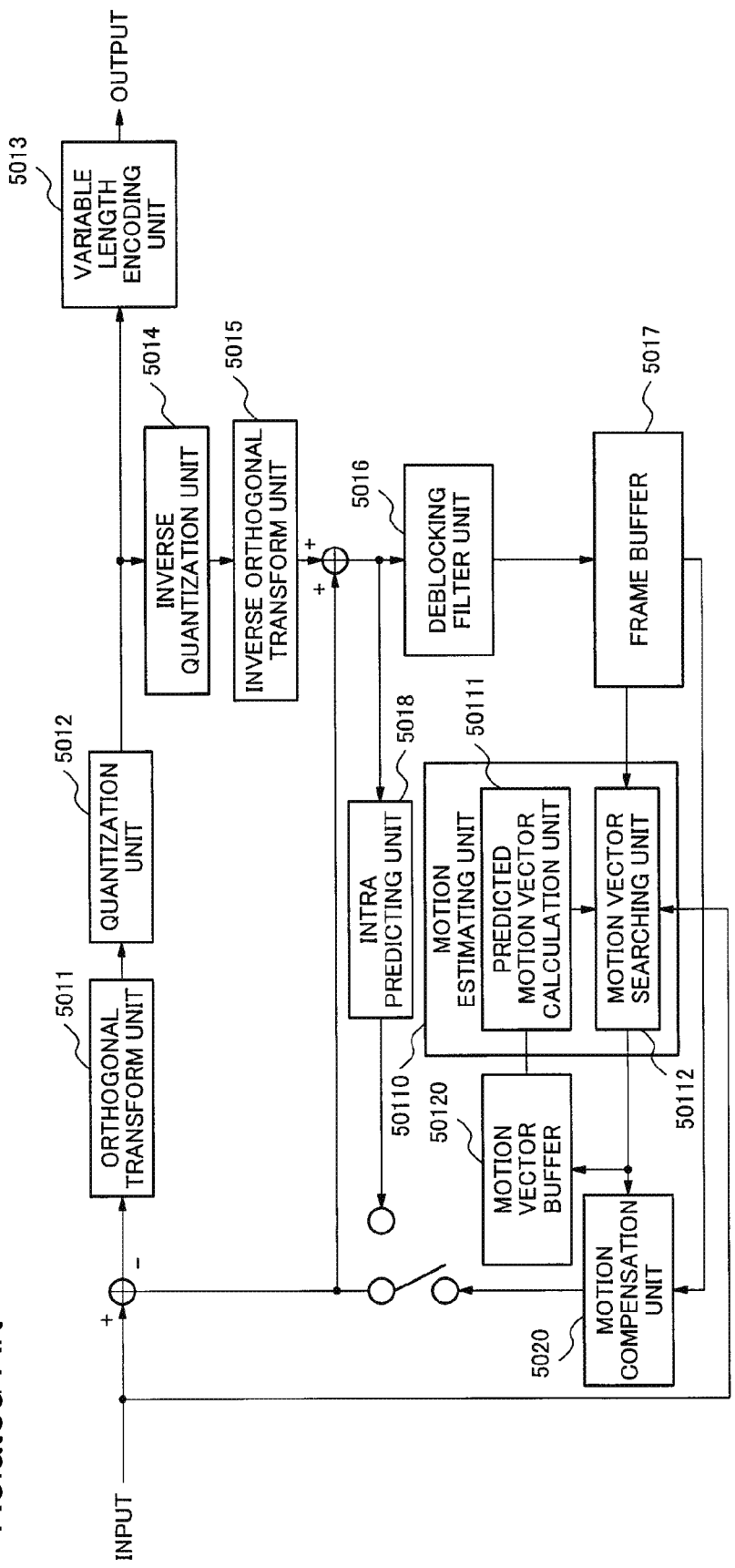
FIG. 30 is a block diagram for explaining a configuration of a video image encoding device described in non-patent document 1.
Figure 31:
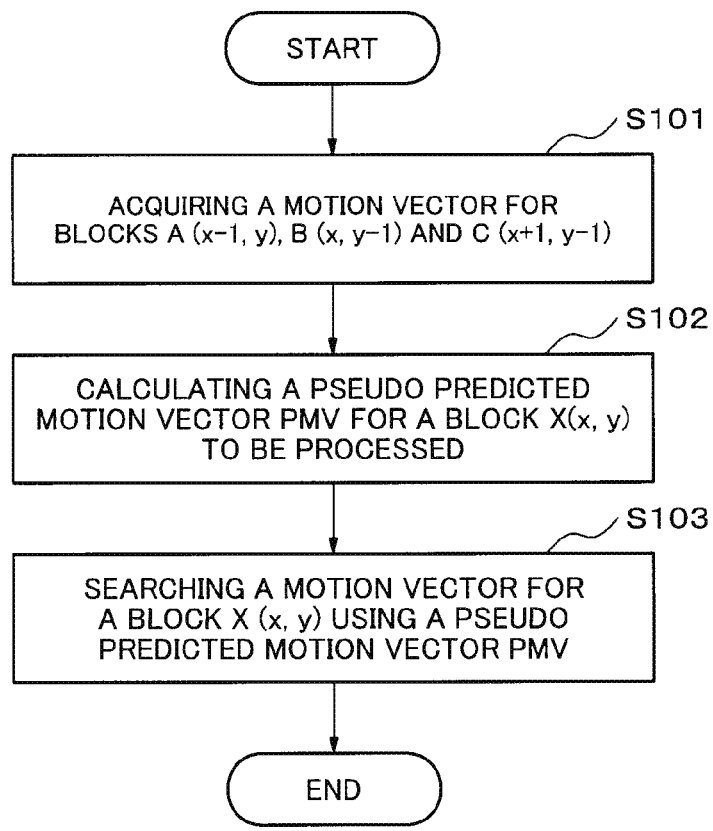
FIG. 31 is a flow chart for explaining operation of the video image encoding device described in non-patent document 1.

As an example of the effect of this example, an example which processes in parallel a full HD size image with 1920×1080 pixels is shown. The number of blocks that can be processed in parallel and the processing frequency (processing order number i in FIG. 28) of non-patent document 4 and this example are shown in FIG. 29. While the processing frequency of a parallel video image encoding device described in non-patent document 4 is 254 times, the processing frequency is 187 times and reduced by 26% in this example. That is, if all processing time per a macro block is same, and a used parallel computer, that is, a GPU has the parallel processing power of no smaller than 120 in this example, processing time of motion estimation can be reduced by 26% compared with the technique of non-patent document 4.

Above, the preferred example of the present invention has been described. The present invention does not limit the range to only the above example, and the operation which performed various change in the range that does not deviate from an outline of the present invention is possible. Although the motion estimation process is performed in parallel for each macro block in the above mentioned example, a parallel processing unit is not limited to the processing of one macro block. That is, the present invention can also be applied to processing of an image divided in area ranges besides the macro block. A GPU is used as a parallel processor in this example. However, the implementation by other parallel computers such as a multi-core processor on which a plurality of CPUs are integrate and a computer cluster with which a plurality of computers are connected is also possible.

Incidentally, the first to the seventh exemplary embodiments and the example described above can be realized as a predetermined hardware, for example a circuit.

And the first to the seventh exemplary embodiments and the example described above may be controlled and operated by a computer circuit (CPU, for example) which is not shown based on control programs. In that case, for example, these control programs are stored in a motion estimation device, a storage medium in a video image encoding device or an external storage medium, and are read by the above-mentioned computer circuit and are executed. As the inner storage medium, for example, a ROM (Read Only Memory) and a hard disk or the like can be listed. As an external storage medium, for example, removable media and a removable disk or the like can be listed.

Each of the exemplary embodiments described above can be combined with the other exemplary embodiment.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application claims priority based on Japanese Patent Application No. 2010-284613 filed on Dec. 21, 2010, the disclosure of which is hereby incorporated by reference in its entirety.

INDUSTRIAL APPLICABILITY

The present invention relates to a motion estimation device, a motion estimation method, a motion estimation program and a video image encoding device and has industrial applicability.

REFERENCE SIGN LIST

11 Orthogonal transform unit
12 Quantization unit
14 Inverse quantization unit
15 Inverse orthogonal transform unit
16 Deblocking filter unit
18 Intra predicting unit
20 Motion compensation unit
100 Parallel motion estimation device
110 Motion estimating unit
111 Pseudo predicted motion vector calculating unit
112 Motion vector searching unit
120 Motion vector buffer
550 Parallel motion estimation device
510 Motion estimating unit
511 Reference block selection unit
650 Parallel motion estimation device
610 Motion estimating unit
611 Pseudo predicted motion vector precision judgment unit
612 Reference vector selection unit
1000 Parallel video image encoding device
1100 Block encoding unit

What is claimed is:

1. A computer-implemented motion estimation device for predicting a vector by referring to motion vectors of adjacent blocks, the device comprising:
   a processor; and
   a memory storing instructions to be executed by the processor by causing the processor to execute:
   a plurality of motion estimating units which perform parallel processing for processing object blocks, in which each neighboring processing object block forms a line, wherein:
   each of the plurality of motion estimating units comprises:
      a pseudo predicted motion vector calculating unit for calculating a pseudo predicted motion vector of a corresponding processing object block using motion vectors of a reference block set to which processing has ended; and
      a motion vector searching unit for searching and outputting a motion vector of the corresponding processing object block using the calculated pseudo predicted motion vector; and
   a motion vector buffer for storing motion vectors outputted from the motion vector searching unit in each of the plurality of motion estimating units,
   wherein the pseudo predicted motion vector calculating unit calculates the pseudo predicted motion vector using motion vectors of the reference block set stored in the motion vector buffer which includes at least one block in each of block positions of x, x−s, x+t, y, and y−u (wherein s, t and u are positive integers) to a processing object block position (x,y), and
   when each of the neighboring processing object blocks forms an oblique line, the pseudo predicted motion vector calculating unit calculates the pseudo predicted motion vector using the motion vectors of the reference block set which includes blocks in positions of (x−1,y), (x,y−1) and (x+1,y−2) to the processing object block position (x,y).

2. A motion estimation method for predicting a vector with reference to motion vectors in adjacent blocks comprising:
   performing parallel processing for processing object blocks, in which each neighboring processing object block forms a line, with a plurality of motion estimation units;
   calculating a pseudo predicted motion vector of a corresponding processing object block using motion vectors of a reference block set to which processing has ended in each motion estimation unit;
   searching and outputting a motion vector of the corresponding processing object block using the calculated pseudo predicted motion vector in each motion estimation unit; and
   storing the motion vectors of block to which processing has ended and outputted from each of the plurality of motion estimation units,
   wherein the calculating step calculates the pseudo predicted motion vector using motion vectors of the reference block set stored in the storing step which includes at least one block in each of block positions of x, x−s, x+t, y, and y−u (wherein s, t and u are positive integers) to a processing object block position (x,y), and
   when each of the neighboring processing object blocks forms an oblique line, the calculating step calculates the pseudo predicted motion vector using the motion vectors of the reference block set which includes blocks in positions of (x−1,y), (x,y−1) and (x+1,y−2) to the processing object block position (x,y).

3. A non-transitory computer-readable recording medium having embodied thereon a motion estimation program, which when executed by a computer, causes the computer to function as a motion estimation device for predicting a vector with reference to motion vectors in adjacent blocks and performing the following functions comprising:
   a function of performing parallel processing for processing object blocks, in which each neighboring processing object block forms a line, with a plurality of motion estimation units;
   a function of calculating a pseudo predicted motion vector of a corresponding processing object block using motion vectors of a reference block set to which processing has ended in each motion estimation unit;

a function of searching and outputting a motion vector of the corresponding processing object block using the calculated pseudo predicted motion vector in each motion estimation unit; and a function of storing the motion vectors of blocks to which processing has ended and outputted from each of the plurality of motion estimation units, wherein the function calculating calculates the pseudo predicted motion vector using motion vectors of the reference block set stored in the function of storing which includes at least one block in each of block positions of x, x−s, x+t, y, and y−u (wherein s, t and u are positive integers) to a processing object block position (x,y), and when each of the neighboring processing object blocks forms an oblique line, the function of calculating calculates the pseudo predicted motion vector using the motion vectors of the reference block set which includes blocks in positions of (x−1,y), (x,y−1) and (x+1,y−2) to the processing object block position (x,y).

* * * * *